(12) United States Patent
Taylor et al.

(10) Patent No.: US 7,559,508 B1
(45) Date of Patent: Jul. 14, 2009

(54) PROPELLANT DEPOT IN SPACE

(76) Inventors: Thomas C. Taylor, 3705 Canyon Ridge Arc, Las Cruces, NM (US) 88011; Walter P. Kistler, 123 105th Ave., SE., Bellevue, WA (US) 98004; Robert A. Citron, 123 105th Ave., SE., Bellevue, WA (US) 98004

( * ) Notice: Subject to any disclaimer, the term of this patent is extended or adjusted under 35 U.S.C. 154(b) by 207 days.

(21) Appl. No.: 11/608,221

(22) Filed: Dec. 7, 2006

(51) Int. Cl.
*B64G 1/00* (2006.01)
(52) U.S. Cl. ............... 244/172.2; 244/159.4; 244/172.3
(58) Field of Classification Search ............... 244/159.4, 244/159.6, 172.2, 172.4, 172.3, 158.1, 172.5
See application file for complete search history.

(56) References Cited

U.S. PATENT DOCUMENTS

| | | | |
|---|---|---|---|
| 3,938,347 A | 2/1976 | Rideal | |
| 4,699,339 A | 10/1987 | Rosen | |
| 5,092,545 A * | 3/1992 | Butterfield et al. | 244/158.1 |
| 5,305,970 A * | 4/1994 | Porter et al. | 244/172.2 |
| 2002/0130222 A1* | 9/2002 | Anderman | 244/158 R |
| 2007/0051854 A1* | 3/2007 | Behrens et al. | 244/172.3 |

OTHER PUBLICATIONS

Robertson, Donald F., "The Oxygen Road", Space News, Jul. 5, 2006; pp. 19 and 21.
Office of Science and Technology Policy, "U.S. Space Transportation Policy Fact Sheet", Jan. 6, 2005; pp. 1-8.

* cited by examiner

*Primary Examiner*—Timothy D Collins
(74) *Attorney, Agent, or Firm*—Fulbright & Jaworski LLP

(57) ABSTRACT

A space transportation propellant depot has multiple locations, sources and capabilities. Maximizing known mature technologies coupled with realistic industrial techniques results in the incremental development of a propellant source on the moon. Propellant depots are economically driven locations with defined services, sources of propellant and innovation in the pursuit of transportation related commerce as mankind explores for resources beyond Earth.

16 Claims, 14 Drawing Sheets

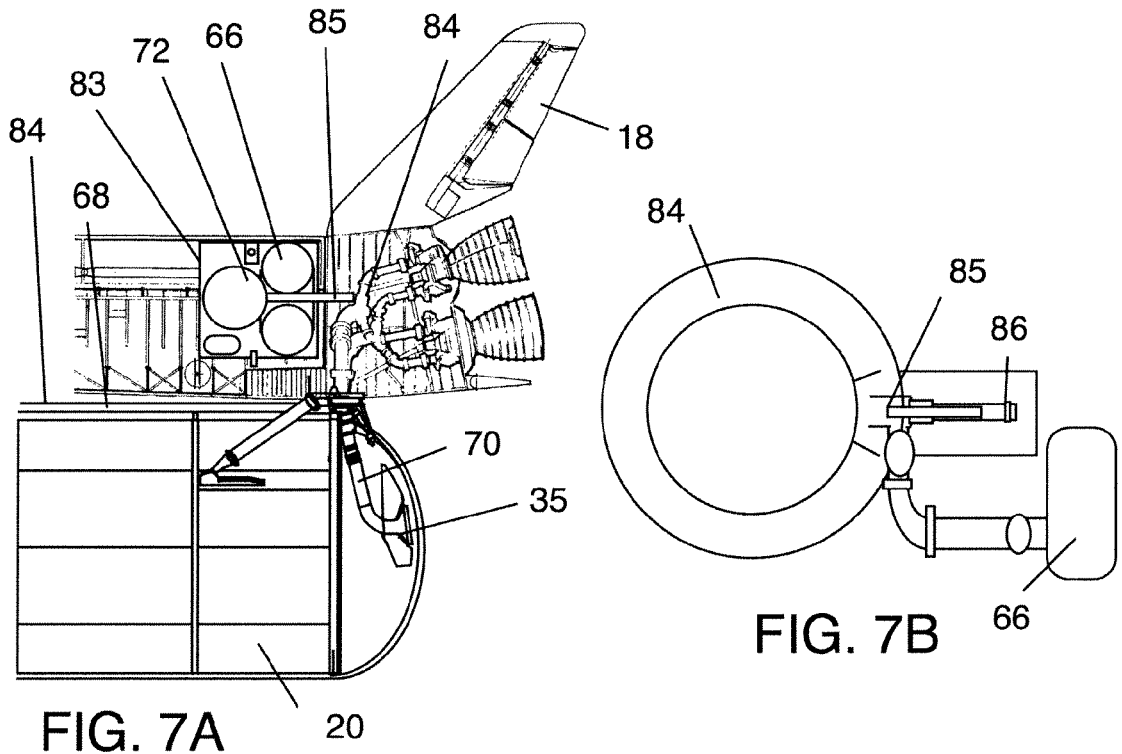
FIG. 7A
FIG. 7B
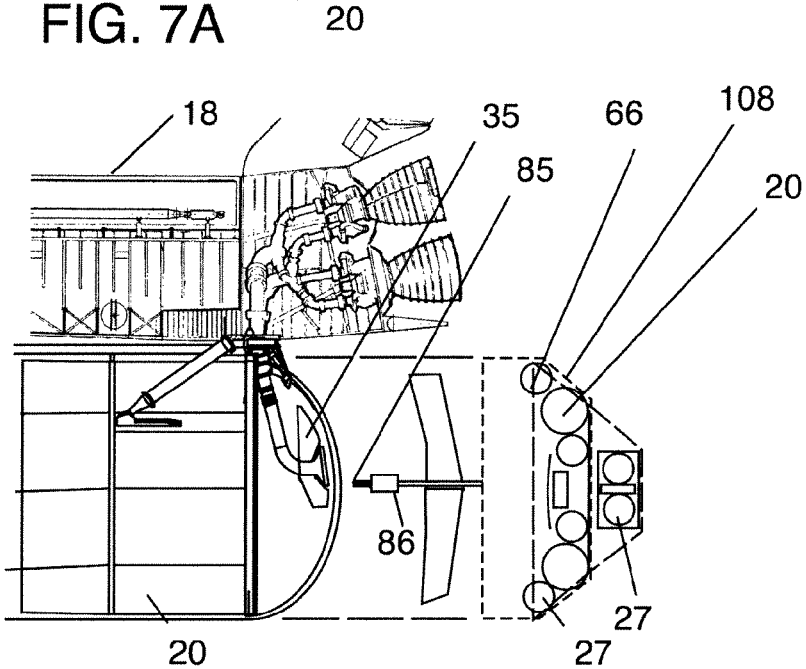
FIG. 7C

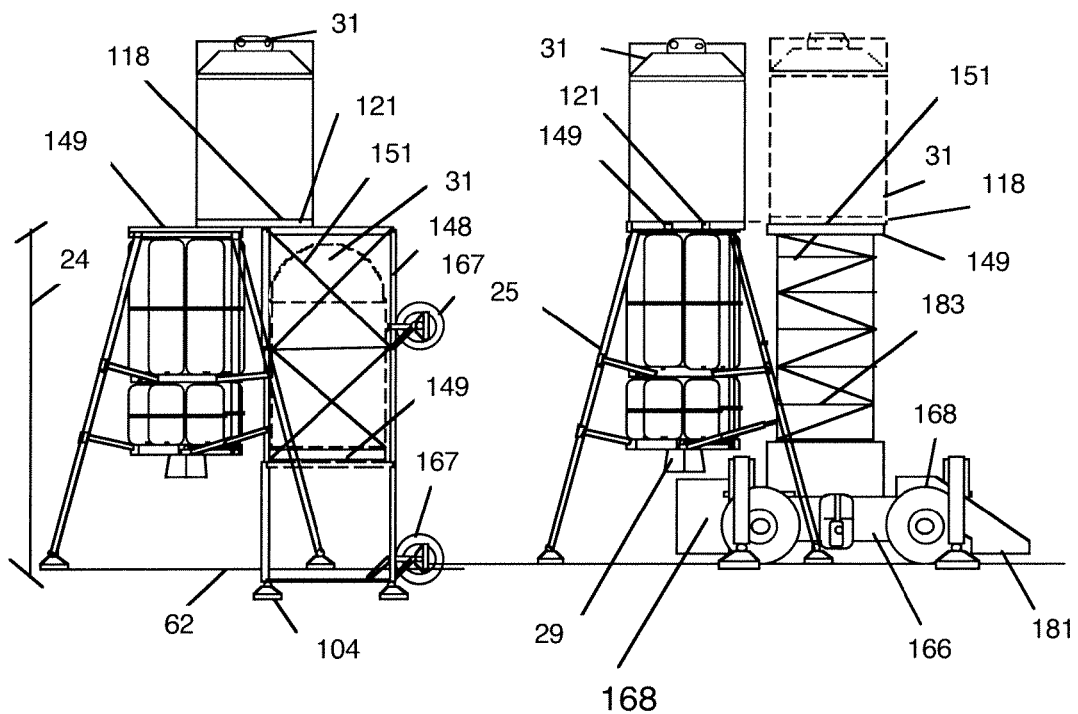
FIG. 11A
FIG. 11C
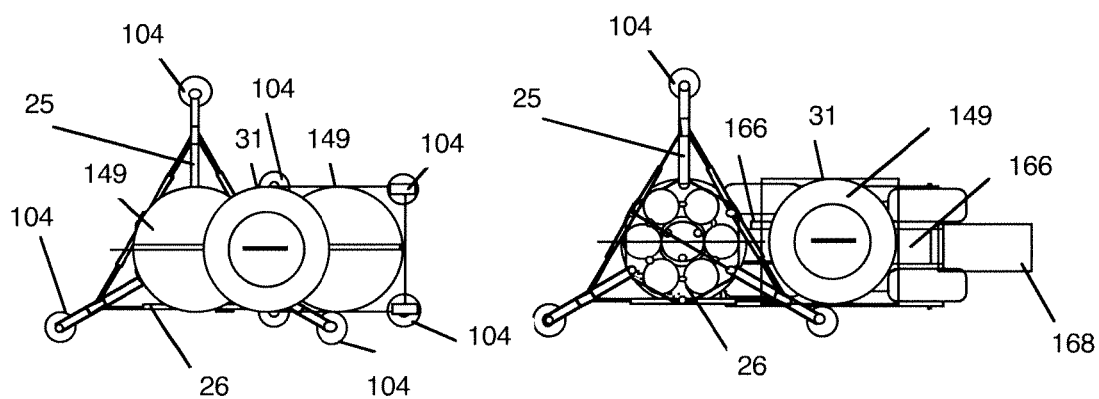
FIG. 11B
FIG. 11D

PROPELLANT DEPOT IN SPACE

CROSS-REFERENCE TO RELATED INFORMATION

This utility patent application claims the benefit of the filing of U.S. Disclosure Document No. 596186, entitled "Lunar Transportation Propellant Depot Architecture and Vehicle 1" filed on Mar. 9, 2006, and the disclosure thereof is expressly incorporated herein by reference in its entirety.

This utility patent application also claims the benefit of the filing of U.S. Disclosure Document No. 605268, entitled "Lunar Surface Exploration" filed on Aug. 28, 2006, and the disclosure thereof is expressly incorporated herein by reference in its entirety.

This utility patent application also claims the benefit of the filing of U.S. Disclosure Document No. 605286, entitled "Salvage NASA CEV & Space Exploration Hardware," filed on Aug. 28, 2006, and the disclosure thereof is expressly incorporated herein by reference in its entirety.

This utility patent application also claims the benefit of the filing of U.S. Disclosure Document No. 539794, entitled "Recovery of Propellant from the ET in Orbit," filed on Oct. 18, 2003, and the disclosure thereof is expressly incorporated herein by reference in its entirety.

NO GOVERNMENT RIGHTS

No government funding, no government support or government contract or clause is related to this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

FIELD OF THE INVENTION

The present invention relates to space transportation. More specifically, the present invention relates to a series of commercial propellant depots in low earth orbit and elsewhere in the universe, and supply sources for the depots.

BACKGROUND OF THE INVENTION

The transportation of cargo between destinations on the Earth's surface has been expensive, but these costs have been overcome with time, and mature transportation markets have emerged. Container freight has, for example, recently solved the disconnect between the ocean and land travel vehicles. In New York Harbor, longshoreman, for example, would extract an unannounced tax of about 10% on Irish Whiskey by losing some whiskey in the unloading process. Containers now accelerate the cargo transfer from ocean to other forms of transportation vehicles with less chance for loss and less manpower. The harbor is also convenient for the sale of other transportation services like fuel as well as other unrelated commercial services. Eventually harbors grow beyond transportation related services into locations of commerce with transportation services as one of many industries within a city.

The transportation from the earth's surface to destinations in space is currently expensive. All or most business ventures in space start with transportation, so the high cost of transportation slows the growth of commercial space. The high transportation cost creates a barrier to travel and to the commercial development of space by stifling the investment of private capital in technically viable ventures on the emerging economic frontier of space.

Part of the problem is transportation to orbit requires a transportation vehicle that operates in both the atmosphere and the vacuum of space. The traditional rocket punches up through the atmosphere and operates successfully in orbit. Some stages or sections of the rocket are expended and discarded in the trip to reduce the mass and permit the mission to attain orbit.

Discarded elements are something to minimize in space transportation, partly because it takes the discarded elements nine times the mass per pound, to move the mass to Earth orbit, up through the gravity well of Earth. Once the mass is transported up through the gravity well, then the transportation investment has been made for that mass and the mass takes on an invested value equal to somewhere between zero, in the case of useless mass with no second use in orbit or elsewhere in the universe, to as much as $10,000 to $25,000 per pound, in the case of mass transported to orbit by the space shuttle that can find a secondary use or a reprocessed use in space.

Air travel in the atmosphere is common and relatively inexpensive. After over 100 years of aircraft development experience, the commercial air travel environment is diversified, deregulated and in need of an innovative shot to move into the 21st century. A solution that captures the market and still attacks the high cost of transportation would be ideal. Mankind can learn from history and bring the aircraft and space transportation innovation together.

Two problems to which the present invention is directed include safety and capacity.

Safety: Launch systems with cryogenic propellants and high speed rotating machinery are fundamentally unsafe systems. Most of this space launch hardware is technically complicated partly due to the fact that it is designed to work in two environments. First, the space launch vehicle operates as it climbs out of the gravity well and in atmosphere that varies from sea level to orbit. Second, the same vehicle operates in the vacuum of space with no gravity well. The same vehicle is designed for both environments and may be more expensive as a result. Individual more efficient vehicles designed for each of the vastly different environment may be more economical.

Capacity: A specific launch system has a payload capacity to support a narrow variety of missions. Rockets capable of overcoming the gravity well of Earth, need to be 90% propellant and 10% other mass, like tanks and payload, or they do not launch. Most Expendable Launch Vehicles (ELVs) are built vertically or one item at a time on the pad. Payloads are further complicated by the requirements to fit into the specific partly reusable vehicles. Both issues significantly drive up payload costs. Transporting the propellant needed for a trip to Mars on a Mars vehicle launched from Earth is an unrealistic burden for the vehicle. A propellant depot beyond the Earth's surface could help this situation.

Huge economic benefits might be realized if a launch system could be developed that had significant atmospheric travel applications and could make the transition to space as required. Propellant depots could provide services to such Trans-Atmospheric vehicles, whose ultimate destination is another location on Earth.

U.S. Pat. No. 4,699,339 to Rosen, entitled "Apparatus and Method for Transporting a Spacecraft and a Fluid Propellant from the Earth to a Substantially Low Gravity Environment Above Earth," discloses an invention that includes separating propellant mass from the final propellant tankage in an attempt to reduce the final fluid tank structure weight of the final satellite or deep space mission, where excess mass causes problems and expense. While in U.S. Pat. No. 4,699,339 some propellant is suggested to be transferred in orbit, it does little to focus on the economics of reusable tanks, but suggests two tanks for the same fluid with one being heavy and designed for launch loading requirements and a second tank carrying nothing through the difficult launch phase, so as to minimize the second tank's mass in space.

There is a need to eliminate the requirement that the entire space transportation operation originate on Earth's surface. In simple terms, eliminating this requirement would allow more efficient space transportation vehicles to be used in each transportation cycle between propellant depots or nodes.

SUMMARY OF THE INVENTION

The present invention is directed to the support of space transportation and related space transportation support infrastructure. In one embodiment, a series of facilities starts in low Earth orbit (LEO) and extends beyond. The support facility begins as a simple propellant depot, and can evolve into an advanced propellant depot. Eventually, the advanced propellant depot can develop into an advanced transportation node.

The facilities can have an adjustably shaped and modified exterior structure that is capable of growing with expanding markets. The facilities can include internal life habitation support, cargo services, the acceptance, storage, and transfer of cryogenic propellant and/or containers of all sorts, and other transportation support related business. The structural growth is preferably accomplished in some part with reusable hardware and the spent vehicles used for delivery to the facility. The propellant depot is also preferably capable of orbital re-positioning and long-distance self-transport in later stages of development. As in Earth based fueling stations, the source of fuel supplies changes consistent with the economics and technology at hand.

In accordance with a commercial launch and space transportation vehicle operations aspect of the present invention, transport services are delivered to vehicles traveling from points on Earth to other points on Earth using the upper atmosphere. Transport services can also be provided to vehicles traveling between low Earth orbit and Earth, as well as vehicles leaving Earth orbit for destinations beyond low Earth orbit facilities. Thus, the depot acts as a vehicle way station with transportation support that could stimulate commercial space travel, space solar power and movement of mankind off the planet.

A primary object of the present invention is the collection, storage and transfer of propellants and other transportation services at a profit, while providing cost reduction and expansion capabilities.

A primary advantage of the present invention is the ability to operate as a commercial propellant depot and evolve toward other services by providing cost reduction and increased efficiency to customer vehicles in space transportation endeavors. These vehicles include transatmospheric vehicles, orbital launch vehicles to low Earth orbit (LEO), and space transportation vehicles moving beyond the Earth vicinity.

In one embodiment, the propellant depot consolidates and stores cryogenic tanks for a lunar transportation company and stores and fills large cryogenic tanks for storage and filling of vehicles headed to the moon, to Mars, and beyond. The propellant depot could fill any type of cryogenic containers, including, for example: (1) Space Station tanks storing water, power or propellant; (2) previously disposable cryogenic tanks after they are modified to become reusable tanks; and (3) Extended Duration Orbiter (EDO) tanks in the payload bay of the orbiter.

In one embodiment, the propellant depot stores fuel salvaged from the Flight Propellant Reserve (FPR), i.e., 25,000 to 50,00 pounds of cryogenic propellant remaining in the external tank (ET) after attaining orbit.

In another embodiment, the propellant depot accepts the Aft Cargo Carrier (ACC) of the space shuttle including: disposable cryogenic tanks that are converted to be reusable; military vehicles; commercial orbital maneuvering vehicles; and ISS logistics and power water cryogenic commercial containers. The accepted Aft Cargo Carrier could also include larger tanks for the commercial propellant depot; and NASA and other government vehicles and their tanks.

In yet another embodiment, the propellant depot grows using the spent delivery stages traveling from Earth. With the added mass, the propellant depot can expand into a true transportation node with capabilities beyond propellant services. The propellant depot preferably has a long axis, a frame, and an ability to add mass and length at individual locations. The propellant depot can also later evolve to transfer payloads, propellant tanks, and humans, and to use tethers to enhance payloads. The structure of the propellant depot preferably has a semi-flexible exterior with trusses capable of using the discarded vehicle stages in combination with truss segments and other enhancement materials transported from Earth. A semi-flexible exterior can be shaped into vehicle hangers, cryo storage, habitation and other uses using enhancement materials transported from Earth. In one embodiment, the present invention includes storing cryogenics liquids in vacuum shade in boil-off limiting protective enclosures or other structures providing shade and vacuum.

In one aspect, the commercial depot vehicle includes a single, affordable, robotic servicing device with an interface located along the truss to provide robotic services to vehicles and payloads.

The depot can have a propulsion apparatus enabling the propellant depot to operate as a self-transporting depot vehicle in space. The self-transporting depot can store onboard propellants for its onboard propulsion system, as well as depot tanks for refilling customer vehicle tanks. The self-transporting depot vehicle is capable of moving to other locations in space and attaining various orbits around various celestial bodies in space under its own power and propulsion.

Advantages of the present invention include cost effectiveness, sustainability, reliability, efficiency, and the ability to provide atmospheric/orbital transportation service operations with minimal new technology subsystems required. In one aspect, the present invention permits re-configuration of the depot's shape and function to accommodate specific customer systems.

Another advantage of the present invention is that it enables separation of vehicle hardware technologies. More specifically, technologies required for launch up through the atmosphere can be separated from vehicle hardware technologies needed for re-entry. Thus, it would no longer be required to use the same hardware for both dissimilar phases: Earth launch to orbit and re-entry into the atmosphere from Earth orbit. An opportunity is provided for elimination of some subsystems and the addition of other subsystems to produce a different launch vehicle including the ability to move from the Earth's surface to high altitudes, boost above the atmosphere, operate for a time out of the atmosphere and then re-enter the atmosphere.

Another advantage of the present invention is the depot vehicle design accommodates services beyond propellant sales. For example, the depot could be positioned at a location to facilitate component storage and assembly, such as for large assembled projects too big to be launched on a single launch vehicle from Earth.

Another advantage of the present invention is the size of the vehicle (hence payload capacity) is not limited by the size of propellant tanks.

Typically, expendable launch vehicles are used for the first leg of the trip to the moon and these stages can be salvaged. This first leg requires over 70% of the cost of the trip to the moon and can provide valuable salvage opportunities. One advantage in using "spent" stages in the build up and evolutionary growth of the propellant depot is: these discarded or "spent" stages are generally transported to orbit "cost free" or the transportation is already paid for by the first customer. By using a single or multiple groups of basic launch vehicle configurations and sizes to build or assemble the orbital propellant depot facilities, the depot platform gains the required mass, length and "pre-paid" transportation benefits at a greatly reduced cost. This gain can be accomplished by pre-planning relatively minor additions of attach points and other modifications to the original launch vehicle hardware to facilitate the use of the "transportation free" salvaged hardware in orbit. These vehicle modifications allow the coupling and attachment of these "spent" stages in orbit to the evolving and growing facilities in space.

The platforms benefit by adding the mass and length necessary for later tether operations. These spent launch vehicle systems can also provide large volumes of storage shielded from the sun, for example, for those propellant systems that use a pre-filled tank from Earth and only require a hard vacuum volume without the sun or Earth radiation. The non-atmospheric portion of the trip to the moon for a pre-filled tank is already economical, partly because of the hard vacuum of space, but it could be further enhanced by a secondary sun and Earth glow shield protection during the non-atmospheric portion of the trip.

According to an aspect of the invention, an orbital propellant depot system includes a low Earth orbit propellant depot and a lunar orbit propellant depot. The low Earth orbit propellant depot is supplied with propellant from an Earth based source. The low Earth orbit propellant depot stores propellant and refueling vehicles. The lunar orbit propellant depot is supplied with propellant from a lunar propellant source. The lunar orbit propellant depot stores propellant and refueling spacecraft.

According to another aspect, a method of developing a lunar orbit propellant depot includes constructing the lunar orbit propellant depot with salvaged launch vehicle stages and basic frame structures.

According to yet another aspect, an orbital propellant depot includes a basic frame structure having expansion connectors, at least one salvaged launch vehicle stage having a second use attachment, and cryogenic storage.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating preferred embodiments of the invention and are not to be construed as limiting the invention. In the drawings:

FIGS. 7A-7C show recovery of propellant from the ET as a propellant source for the propellant depot, according to an aspect of the present invention;

FIGS. 11A and 11B depict a side view and plan view, respectively, of an initial payload unload on the lunar surface, according to an aspect of the present invention;

FIGS. 11C and 11D depict a side view and plan view, respectively, of a subsequent payload unload on the lunar surface, according to an aspect of the present invention;

DETAILED DESCRIPTION

The propellant depot systems of the present invention offer an affordable commercial transportation solution for accessing space by combining existing technologies with innovation.

Expendable launch vehicles are the rule currently with only one partly reusable space shuttle vehicle being phased out as overly expensive. Future Reusable Launch Vehicles (RLVs) used in lunar transportation trade routes offer some potential affordability in the transportation to orbit and beyond Earth orbit, but the amount of cost reduction varies greatly. Commercial propellant depots can enhance the cost reduction required for mankind's movement off the planet. These evolutionary propellant depots and the RLVs using the propellant are further enhanced by innovation in both commercial depots and vehicles to provide affordable space transportation.

The present invention combines a consumable product, propellant, with various developed propellant sources, with space transportation vehicles and combines a service at the commercial propellant depot with the space vehicle itself. The propellant depot moves expendable space vehicles from an environment or mode of disposal of launch hardware into a different mindset where the cost reduction possible with reusable launch vehicle technologies with propellant can create new transportation alternatives.

The present invention proposes several methods of creating, storing and handling the propellant in a commercial manner. While the present NASA space launch vehicles are viewed as expendable, the present invention provides salvage ability and the innovation to evolve to reusable space vehicles in a progressive alternative to commercialize successive transportation cycles of the movement of mankind off a single planet and toward other resources on other celestial bodies In summary, the present invention uses transportation innovation to go into orbit, develop new trade routes, develop propellant sources and operate transportation in the environment beyond Earth. The present invention develops new propellant sources, stores propellant, sells it as a fuel and does so with space commercial innovation.

An early orbital space flight vehicle, called the National Space Transportation System (NSTS), commonly referred to as the space shuttle, includes a space shuttle orbiter, external tank (ET), and solid rocket boosters. The current shuttle orbiter external tank mission profile dumps the external tank into end of life disposal on every mission.

Figure 1:
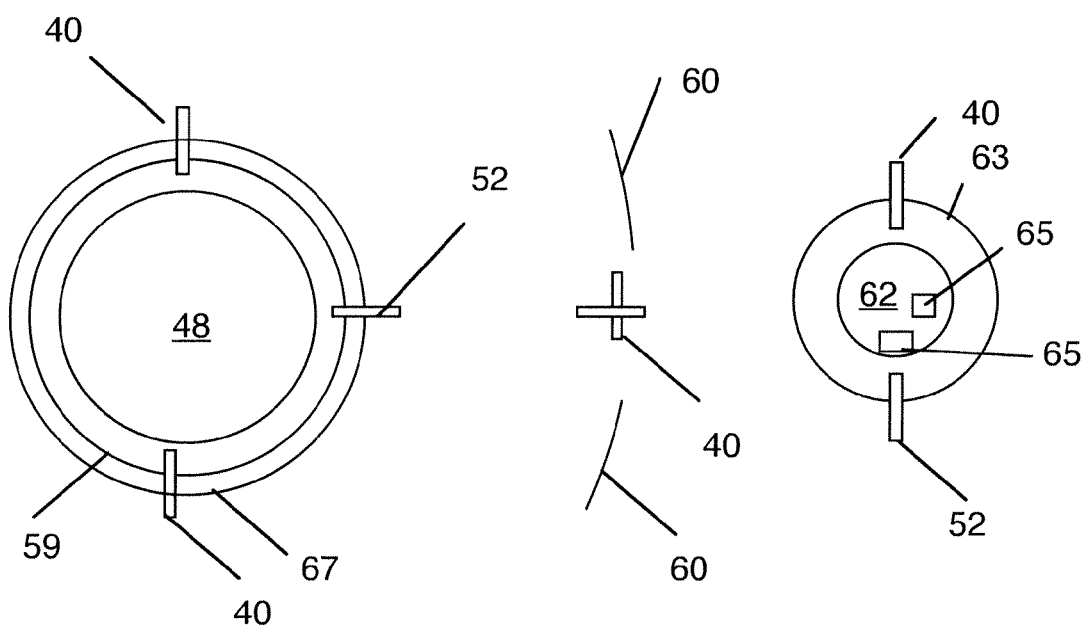
FIG. 1 shows a series of orbital propellant depots and transportation node platforms, according to an aspect of the present invention.

Reference is now made to FIG. 1, which illustrates a preferred embodiment of the invention. The space shuttle orbiter operates from the Earth 48 and can be used to construct propellant depot 40 in regions extending beyond the edge of the atmosphere, such as in low Earth orbit 59 and/or medium Earth orbit 67. Propellant depot 40 can also be located at Lagrange point one 60, and in lunar orbit 63. Lunar orbit propellant depot 40 located in lunar orbit 63 enables exploitation of lunar resources and provides a platform for further space exploration and commercial development of space beyond Earth 48 and the moon 62. The Lagrange point one 60 is at the position where the gravitational pull of the two larger masses precisely cancel the centripetal acceleration required to rotate with them. Lagrange point one 60 is a relatively stable location in space with a balanced attraction toward Earth 48 and moon 62. This can become valuable as a location for a propellant depot 40 and/or a transportation node platform 52, because of the ability to use minimum propellants and other less expensive more efficient ion propulsion to balance the L1 facilities on this "gravity" mountaintop. As with all propellant depots 40, the depots 40 can evolve into transportation nodes 52, e.g., as shown in medium Earth orbit 67 and Lunar orbit 63.

A direct insertion trajectory has been flown using the existing space shuttle orbiter, external tank (ET), and solid rocket boosters. The direct insertion trajectory takes the partly reusable existing space shuttle orbiter and external tank and its flight propellant reserve (25,000 to 50,000 lbs of left over propellant in the external tank and feed lines) to full orbital velocity. The direct insertion trajectory produces an opportunity to salvage some of the transportation value invested in the external tank and its remaining propellant before they are lost when entering into end of life disposal. The salvage of space hardware using minor changes to launch vehicle hardware and software technologies can produce less expensive alternatives to existing transportation.

The expendable portions of the space shuttle system, as well as expandable launch vehicles, can be used to build facilities in orbit including propellant depots. In general, the last to be discarded spent stage could be left attached to the payload on the expendable launch vehicle and used for some orbital purpose, like a propellant depot structure. In the case of the space shuttle, the ET could be salvaged. The value of the expendable stages or external tank is the invested energy in the mass of the expended stages in orbit. In the case of the external tank (ET), this value is approximately $580 m at $10 k/lb, if the external tank has some useful purpose in orbit and replaces mass requiring launch.

Rather than standard ET separation, the external tank separation could be delayed and the ET could be used in the creation of a propellant depot. The flight propellant reserve could also be recovered before re-entry. The propellant salvaged from the external tank could be used to start a propellant depot. The value of this residual propellant is approximately $500 m/yr. to $1 B/yr. in revenue (4 flights×$10 k/lb 100 k to 200 k lbs minus ½ as expenses), if four logistics missions by the space shuttle are used. NASA has already paid for this propellant at ~$1/lb on the ground and paid $10,000/lb of "invested energy" to place the residual propellant and the external tank 20 in orbit.

Some day in the future, space launch vehicles will evolve into reusable single stage to orbit vehicles and only propellant will be expended. These single stage to orbit vehicles will require additional propellant to travel to the next destination in space or on Earth. Single stage to orbit vehicles could help supply the propellant for commercial sales or become customers of the propellant depot. Fully reusable launch vehicles are almost ready to launch in 2006.

In order to supply the propellant depot 40 in lunar orbit 63, regolith could be mined from the moon 62. In this case, a lunar propellant processing depot 65 could be stationed on the moon 62. A number of lunar surface propellant depots 65 are expected to exist on the surface of moon 62 and assist transportation operations.

Eventually, transatmospheric vehicles will become commercially viable with trips to other locations on Earth via near Earth orbit. These transatmospheric vehicles could use the propellant depot for refueling and other services.

FIGS. 2A through 2E depict side views of various lunar transportation payload systems, as well as a simple propellant depot 40, each having the same basic frame structure 26 separating three plates. The payload systems and propellant depot 40 shown in FIGS. 2A through 2E are scalable and can grow to any diameter to accommodate large space launch vehicle payload diameters. The payloads are more efficient due to the economies of scale, if the payload diameter is larger rather than smaller. These payload systems are carried on a launch vehicle as cargo on the transportation leg from Earth to low Earth orbit, but become operating hardware and lunar transportation vehicles once in low Earth orbit.

Figures 2A, 2B, 2C, 2D:
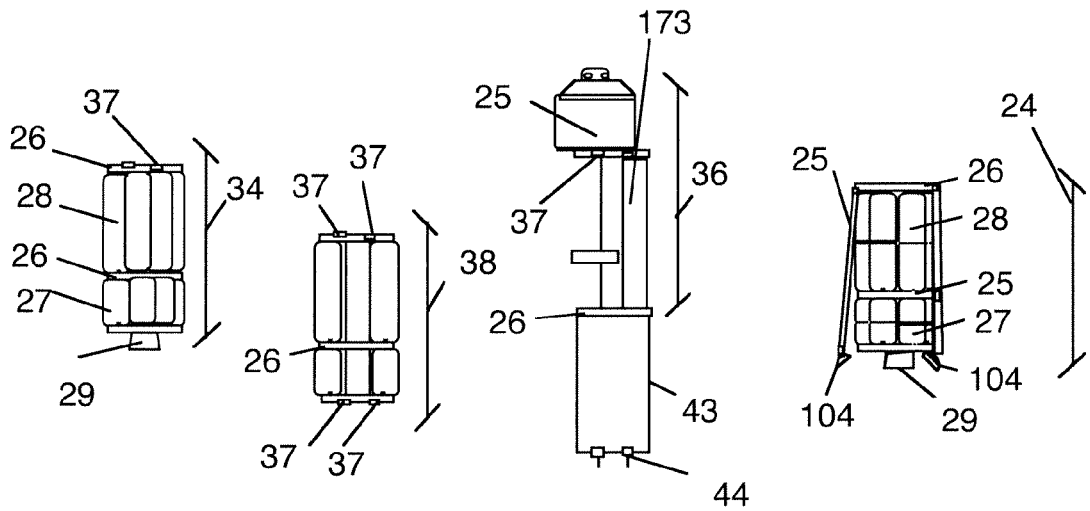
FIGS. 2A-2E depict various systems having a basic frame, according to an aspect of the present invention.

FIG. 2A shows a side view of a propellant transporter 34 designed to transport propellant tanks 27, 28. As noted above, propellant transporter 34 is brought from Earth to low Earth orbit on a launch vehicle. The propellant transporter 34 operates from low Earth orbit to other destinations beyond low Earth orbit as a transport vehicle for carrying propellant. Propellant transporter 34 brings propellant tank sets 27, 28 beyond Earth orbit to any location where refueling in cislunar space is required. They can travel to medium Earth orbit, Lagrane point one, and/or lunar orbit to supply refueling stations or propellant depots.

In one embodiment, the propellant transporter 34 has a single rocket engine 29, attitude control system (ACS) thrusters, a fuel cell power source, computers, an inertial guidance system, and an autonomous rendezvous and docking system (all not shown). Propellant transporter 34 is reusable and forms the backbone of this Earth-Moon transportation system. They also contain mechanisms to autonomously tap into their propellant tanks to create propellant flow to their rocket engine 29. Propellant transporter 34 consists of a basic frame 26 comprising a cylindrical frame structure separating three plates holding a first tank set 27 and a second tank set 28. In one embodiment, the system is designed to transport liquid oxygen tanks 27 and liquid hydrogen tanks 28. Attachment hardware 37 is also shown, although the propellant transporter 34 could be constructed without the hardware 37. The attachment hardware 37 enables the propellant transporter 34 to easily connect with other components.

FIG. 2B shows an exemplary propellant dispenser 38 for transporting propellant tank sets, such as liquid oxygen tanks 27 and liquid hydrogen tanks 28, to low Earth orbit on a launch vehicle. Once in Earth orbit, propellant dispensers 38 rendezvous and dock with spacecraft, such as lunar landers 24 or propellant transporters 34, and transfer cryogenic propellant tank sets to their receiving spacecraft. Propellant dispensers 38 are simple, relatively inexpensive spacecraft that can be discarded after a single use, or used as components of a propellant depot.

The propellant dispenser 38 consists of a basic frame 26 comprising a cylindrical frame structure separating three plates holding tanks, such as liquid oxygen tanks 27 and liquid hydrogen tanks 28. The propellant dispenser 38 also has systems (not shown) designed to find, dock and transfer the tanks to other compatible vehicles. The systems include an autonomous rendezvous and docking system, an Orbital Maneuvering System (OMS) to reach the designated locations for rendezvous and docking with a receiving spacecraft, and an attitude control system (ACS) to achieve proper attitude for docking and separation. The systems also enable the propellant dispenser 38 to find, dock and become a useful component in the build-up of a propellant depot in low Earth orbit.

Propellant dispensers 38 do not have a rocket engine 29 nor are they able to tap into the propellant tanks they carry. In one embodiment, propellant dispensers 38 have the capacity to carry up to six propellant tank sets. Expansion connectors 37 can also be easily added, although the connectors 37 are not required.

FIG. 2C, is a side view of a payload dispenser 36, which also travels to low Earth orbit as cargo in a launch vehicle. The payload dispenser 36 is a transport vehicle for carrying payloads, including odd-shaped payloads. The payload dispenser 36 provides a common interface with lunar landers 24, rendezvous and docks with lunar landers 24, and transfers its payloads to lunar landers 24 in low Earth orbit for transport beyond low Earth orbit, such as to the lunar surface. Payload dispensers 36 can be discarded after a single use or can be combined with their launch vehicle spent stages 43 to be assembled as part of a propellant depot. Second use attachment hardware 44 enables the vehicle spent stages to be connected to various components, for example via expansion connectors 37, and is added to the lunar lander vehicle 24 by its manufacturer.

Similar to propellant dispenser 38, payload dispensers 36 do not have rocket engines. Payload dispensers 36 contain an autonomous rendezvous and docking system (AR&D) (not shown) for rendezvous and docking, an Orbital Maneuvering System (OMS) (not shown) to reach their designated locations in low Earth orbit for rendezvous with a lunar lander 24, and an Attitude Control System (ACS) (not shown) to achieve proper attitude for docking. Payload dispenser 36 consists of a basic frame 26 comprising a cylindrical frame structure separating one or more plates fitting into the Earth launched cargo vehicles. The frame 26 is capable of accommodating a number of additional payloads having the same volume and transfer hardware used by liquid oxygen tank 27 and liquid hydrogen tank 28. Payload dispensers 36 are also capable of transporting expandable payloads 173 and other odd payload shapes 31.

FIG. 2D is a side view of a reusable space vehicle, referred to as lunar lander 24, which operates from low Earth orbit to the moon. Lunar lander 24 consists of a basic frame 26 comprising a series of hexagonal plates in a cylindrical frame structure separating three plates holding liquid oxygen tanks 27 and liquid hydrogen tanks 28. The lunar lander 24 has a rocket engine 29 and landing legs 25 having surface bearing shoes 104. The lunar lander 24 is designed to transport a lunar payload to the lunar surface, and also from the lunar surface to low Earth orbit or directly to the Earth.

Lunar lander 24 receives payloads from payload dispenser 36 in low Earth orbit, receives propellant tank sets from propellant dispenser 38 in low Earth orbit, or wherever they require refueling in cislunar space. For example, lunar landers 24 may be refueled by propellant transporters 34 in medium Earth orbit, at Lagrane point one, and/or in lunar orbit, depending on the size of the payloads being transported to the lunar surface.

Lunar landers 24 have a single hydrogen/oxygen rocket engine 29, ACS thrusters, a fuel cell power source, computers, an inertial guidance system, and an autonomous rendezvous and docking system (all not shown). Using their autonomous rendezvous and docking system (AR&D), lunar landers 24 can robotically receive propellant tank sets from either propellant dispensers 38 or propellant transporters 34. A set of retractable lunar landing legs 25 folded back along the structure allows lunar lander spacecraft to land on the moon and take off from the moon. Lunar landers 24 are reusable and provide reliable two-way transportation between Earth orbit and the lunar surface. Although not shown, expansion connectors 37 can be added to the lunar lander 24.

Figure 2E:
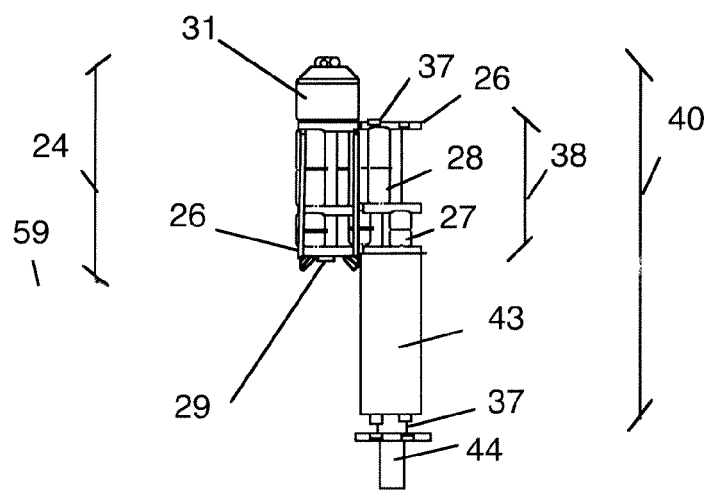

Reference is now made to FIG. 2E, which illustrates a preferred embodiment of a propellant depot 40 docked with a lunar lander 24. The propellant depot 40 can be assembled using the basic frame 26 with expansion connectors 37 and spent launch vehicle stages 43 having a second use attachment 44. In FIG. 2E, a propellant dispenser 38 is a component of the propellant depot 40. The assembly of the propellant depot 40 can use the built in hardware capabilities of an embedded rail roller beam 121 (FIG. 10) used for payload transfer, such as that disclosed in U.S. patent application Ser. No. 11/076,950 to Kistler et al., the disclosure of which is expressly incorporated by reference herein in its entirety. The reboosting of the emerging propellant depot 40 in low Earth orbit is accomplished using leftover propellant. Its expansion uses mass normally discarded.

Having a commercial propellant depot 40 in low Earth orbit provides an orbital location for the delivery of payloads 31, liquid oxygen tanks 27 and liquid hydrogen tanks 28. The propellant depot 40 can reduce the cost and sub-systems required in the propellant dispenser 38 and payload dispenser 36 and can also remove some operational constraints from the logistics support. As the propellant depot 40 evolves into a transportation node 52, it will provide the capability for mass storage, propellant sales, and other transportation services, becoming a center for commerce, like towns and harbors on Earth. As Earth to low Earth orbit hardware and technology advance, additional orbits, e.g., medium Earth orbit, can accommodate the same propellant depot 40 build up sequences and techniques, as discussed with respect to low Earth orbit.

Figure 3:
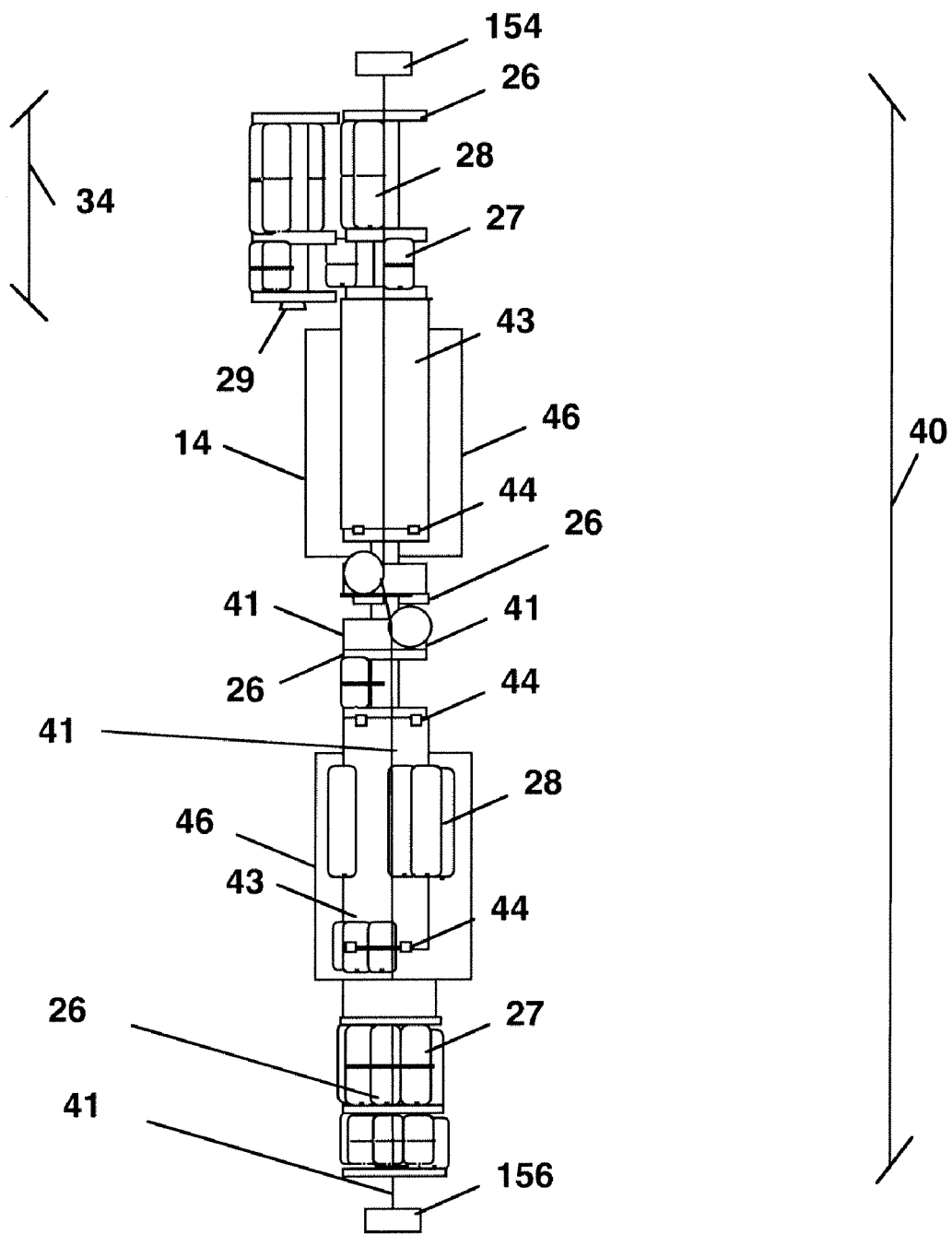
FIG. 3 shows a side view of an expanded propellant depot, according to an aspect of the present invention.

Reference is now made to FIG. 3, which illustrates a more advanced propellant depot 40. The propellant depot 40 is created from discarded elements, such as spent stages 43 having second use attachments 44, and/or basic frames 26 with or without expansion connectors 37, and/or propellant dispensers 38. Creating the propellant depot 40 requires prior planning of the assembly joints. In FIG. 3, a propellant transporter 34 is shown transferring tanks 27, 28 to/from the propellant depot 40.

A tether upgrade package 41 is shown installed with a vehicle capture device 156 and a tether capture device 154. The tether upgrade package 41 requires provisions for cable and motorized reel installation. Tether upgrade package 41 and vehicle capture device 156 provide easier approach and connection services, release services, and gravity gradient stabilization. The propellant depot 40 can also include other components, such as a large sunshade 46 to extend the life of cryogenic propellants in space with thermal protection for basic frame 26 and tanks 27,28.

Figure 4A:
FIGS. 4A-4E show the NASA Ares I CEV and re-use embodiments of the CEV Upper Stage, according to an aspect of the present invention.

The propellant depot 40 can evolve when more than propellant is offered for sale and transfer. The depot 40 starts by providing transportations services and grows beyond these services to become a center of commerce and human habitation. The gradual buildup and increase in propellant depot locations opens the entire universe to mankind and offers a method of using commerce and market expansion to pay for the advances in capability and technology FIG. 4A shows the current design of the NASA Ares I Vehicle 163. A solid rocket booster 22 is connected to transition adapters and an Ares I upper stage 162. Salvage attach hardware 44 is added by NASA and in cooperation with NASA contractors under an agreement with the future salvage company to the salvage of the Ares I upper stage 162. Ares I upper stage 162 has payload attachment hardware and is currently in design. The actual salvage may actually be possible by using payload hardware already on the vehicle. The upper stage 162 includes a liquid oxygen tank 28, a liquid hydrogen tank 27, as well as an intertank 51. The upper stage 162 also includes a rocket engine 29.

Figure 4B:
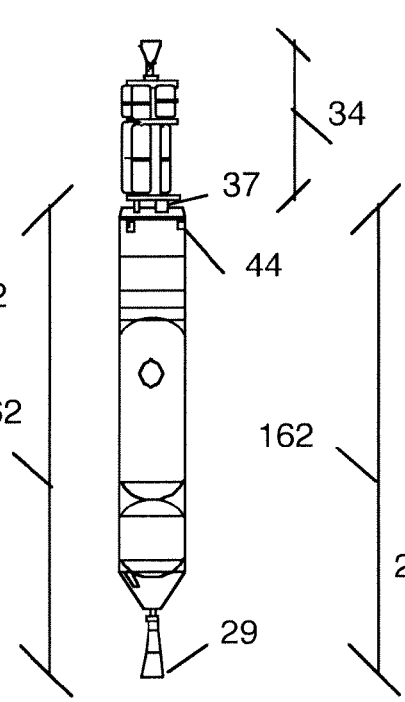

FIG. 4B illustrates salvage of Ares upper stage 162 by propellant transporter 34. Currently the Ares upper stage 162 trajectory may not go all the way to orbit, but designs and trajectories change as they did with the external tank of the space shuttle. In one embodiment, the propellant transporter 34 positions itself, attaches to, salvages, and transports Ares upper stage 162 to a propellant depot 40 for reuse outfitting in orbit.

Figure 4C:
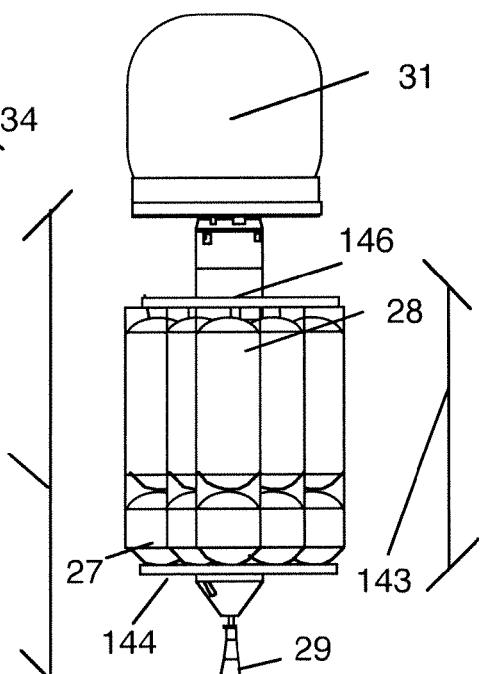

Reference is now made to FIG. 4C, which illustrates a preferred embodiment of the invention and shows salvaged Ares upper stage 162 after orbital outfitting and refueling carrying an unmanned payload 31.

Figure 4D:
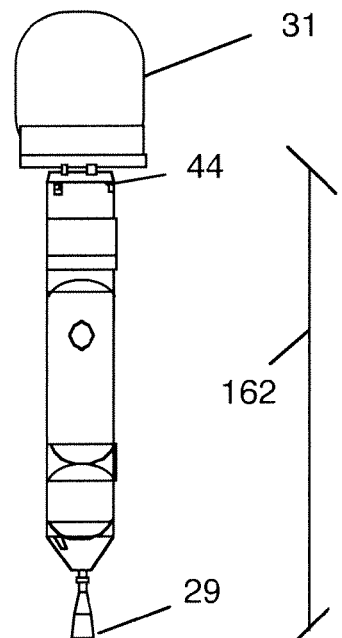
Figure 4E:
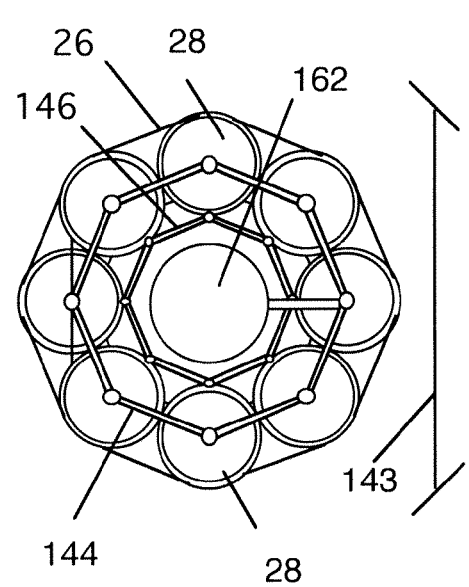

Reference is now made to FIGS. 4D and 4E, which shows side and end views, respectively, of a ring tank 143 to add to Ares upper stage 162 for further enhancement. The ring tank 143 can be added to salvaged Ares upper stage 162 to increase the amount of propellant available to the vehicle, enabling longer trips, e.g., to Mars. The extra propellant could also support additional engines. The ring tank 143 includes a basic frame 26 augmented with rotational vent lines 146 and rotational feed lines 144. The frame 26 supports add-on liquid oxygen tank ring, and liquid hydrogen tank ring providing an enhanced tankage combination for the Ares upper stage 162 after it has been modified to become operable to transport payloads. Ares upper stage 162 is the core of the ring with the ring feeding propellant to core Ares upper stage 162.

Figures 5A, 5B, 5C, 5D:
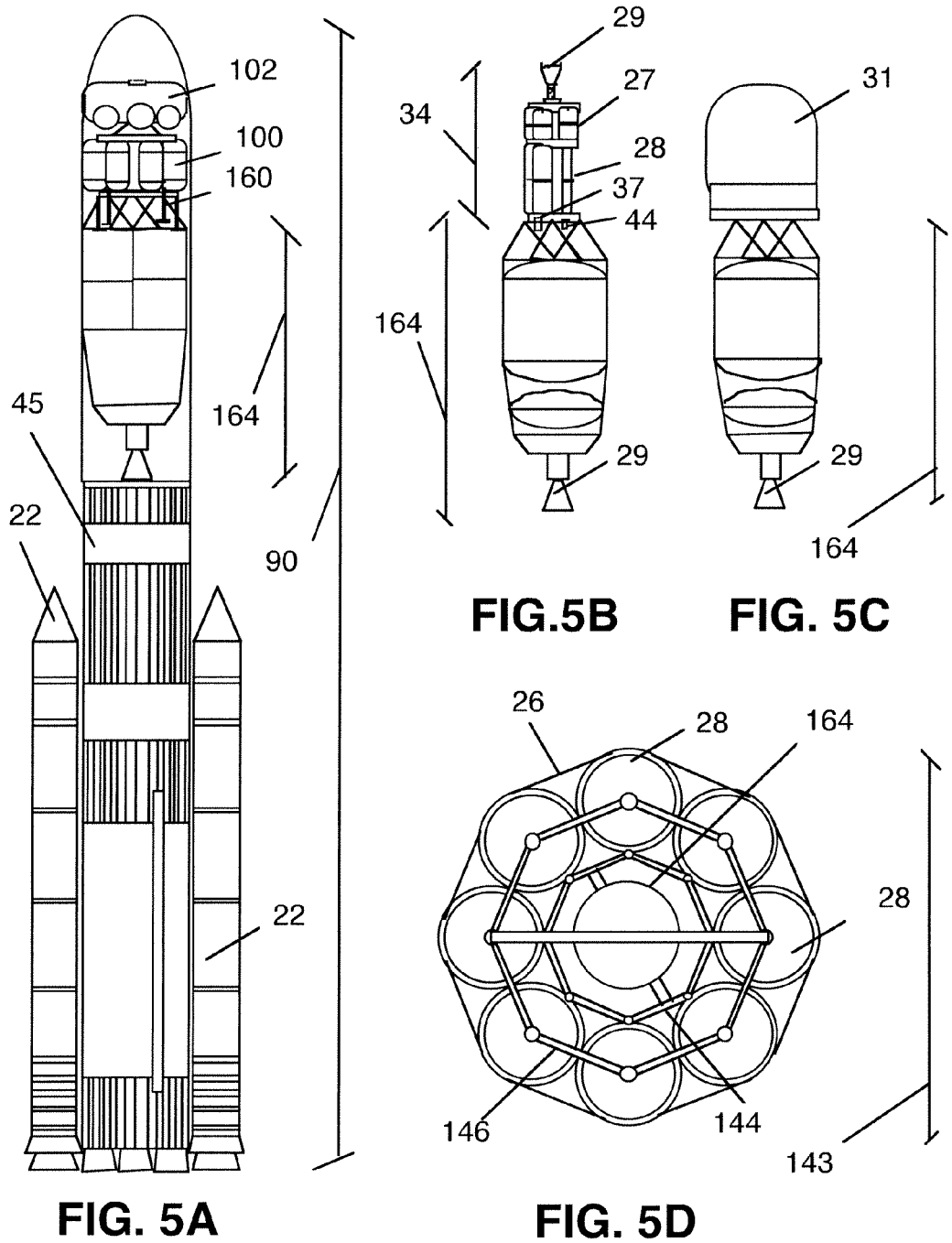
FIGS. 5A-5D depict the NASA Ares V Vehicle and re-use embodiments of the Earth Departure Stage of the Ares V, according to an aspect of the present invention.

Reference is now made to FIGS. 5A-5D, which illustrate another preferred embodiment of the invention. FIG. 5A illustrates the current design of the Ares V vehicle with solid rocket boosters 22 and core expendable launch vehicle 45 attached to Earth departure stage 164 having salvage attach hardware 44. Lunar descent stage 100 and lunar ascent stage 102 are located above Earth departure stage 164.

FIG. 5B shows Earth departure stage 164 being recovered by a propellant transporter 34. FIG. 5C illustrates Earth departure stage 164, after it has been modified so that it can transport payloads. In FIG. 5C, a modified Earth departure stage 164 is shown transporting a payload 31. The modification includes refueling the existing propellant tanks and adapting the ground propellant loading inlet hardware and other items to permit loading propellant and operation in space under microgravity conditions.

FIG. 5D illustrates a top view of a larger diameter ring tank 143 including tanks used to increase propellant available for launching the modified Earth departure stage 164 from various propellant depots 40. As with the ring tank 143 of FIGS. 4D and 4E, add-on liquid oxygen tank 27, and liquid hydrogen tank 28 are held together by rotational propellant feed lines 144 feeding modified propellant inlet hardware and rotational propellant vent lines 146.

Figure 6:
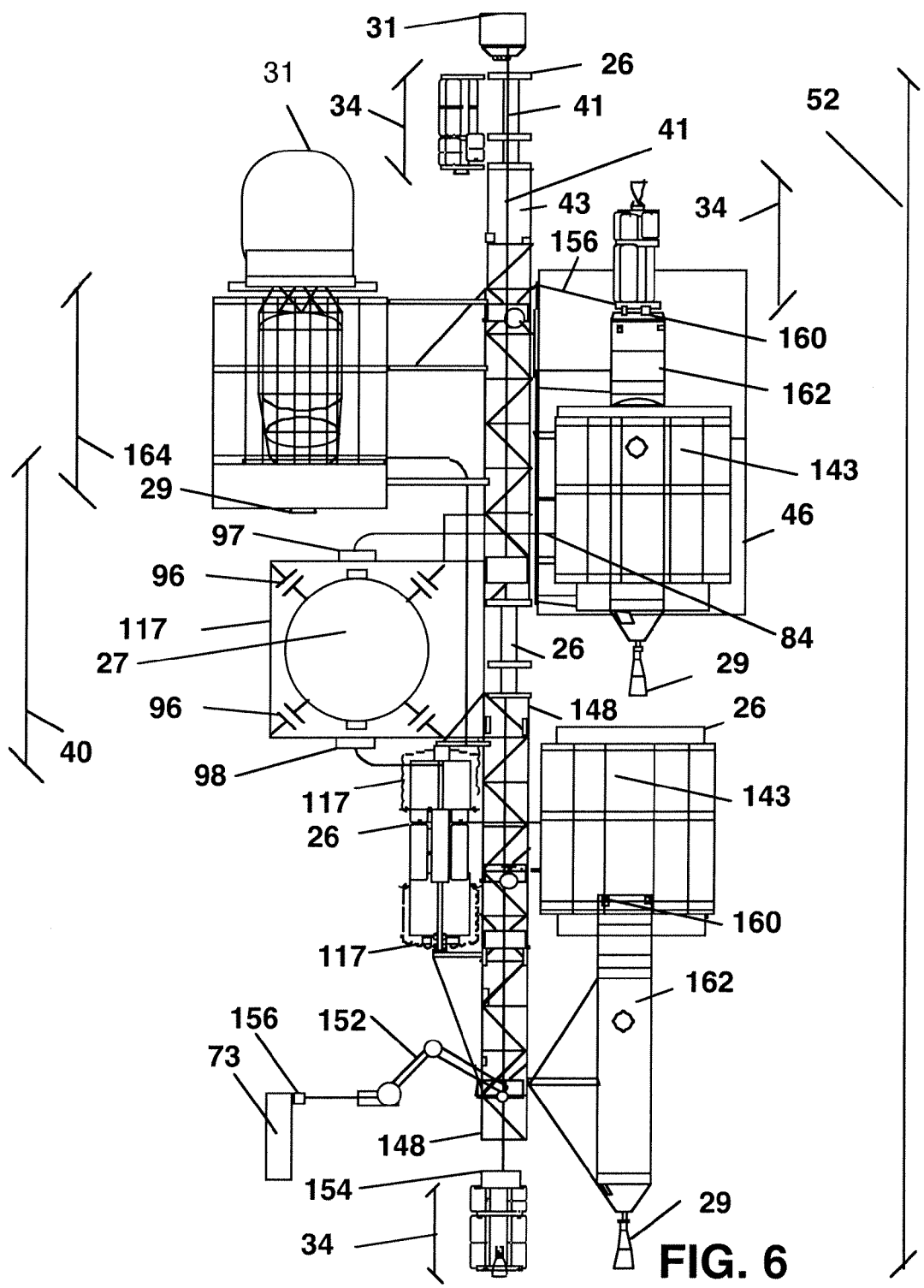
FIG. 6 shows a side view of another evolved propellant depot, according to an aspect of the present invention.

Reference is now made to FIG. 6, which illustrates a transportation node platform 52 evolved from a propellant depot 40. In addition to the platform, FIG. 6 shows salvaged vehicles in three different states, and also shows more advanced long term cryogenic storage.

The transportation node platform 52 is assembled from a variety of components. In one embodiment, a propellant depot 40 is expanded to become the transportation node platform 52. Structural expansion occurs by adding space trusses 148, spent stages 43 having second use attachments 44 and/or various basic frames 26. Spent launch vehicle stages 43 provide a continuing supply of expansion mass for growth as transportation node platform 52 markets grow. The transportation node platform 52 can include long term cryogenic storage 117, a tether upper package 41, and a truss elevator robot 152.

In one embodiment, various types of long term cryogenic storage offer different levels of storage quality, e.g., to store propellant for a longer duration. In one embodiment, the cryogenic storage 117 includes movable multilayer insulation components that surround tanks to shield them, and thus minimize boil off.

In another embodiment, the cryogenic storage 117 uses a series of magnetic suspension plates 96 to hold a large volume cryogenic liquid oxygen tank 27 in place within a hard vacuum shaded volume. The magnetic suspension plates 96 eliminate contact with the tank 27 and thus eliminate the heat flow through traditional tank supports. On Earth, cryogenic tank supports becomes a limiting factor in maintaining the cryogenic liquid, but in the microgravity of space, large heavy tank support is less limited by weight. Magnetic suspension plates 96 can support a heavy cryogenic tank due to a number of space factors, such as minimized gravity. In space, the lack of gravity allows a massive heavy tank to be controlled by a relatively small magnetic repelling force and permits the support of the tank without the structural connection.

The atmosphere provides another avenue for heat to travel to and from a cryogenic tank. The hard vacuum of space also contributes to the effectiveness of the tank by removing the heat exchange due to atmosphere. Long term cryogenic storage 117 is connected to coupler pressurant line 98 and coupler propellant fill/drain line 97 only when required to fill and drain propellant. This automatically controlled disconnect further limits the heat flow in the long term cryogenic storage 117.

A long platform offers a slight gravity, like 1/1000th of one gravity, which is helpful in settling and transferring cryogenic propellant in the microgravity of space. This small amount of gravity can be engineered to provide some ability to flow propellant with little or no pumping, and less reliance on gathering screens and other internal tank devices to manage propellant in low gravity space, thereby reducing typical sources of problems in the transfer of cryogenic liquids. This uniquely small amount of gravity varies in amount based on the distance of the long term cryogenic storage 117 from the center of gravity of the propellant depot 40.

As previously noted, Earth departure stage 164 and upper stage 162 can be salvaged after discard by the owners. Transportation node platform 52 can be an important facility for propellant supply and the reuse preparation. Salvaged liquid oxygen tank 27 and liquid hydrogen tank 28 can be recovered from spent launch vehicle stages 43 and can be reassembled with the help of the tether capture device and humans at the transportation node 52 with some prior planning. Large liquid oxygen tank 27 and liquid hydrogen tank 28 can be used to refill Earth departure stage 164 and upper stage 162 reassembled to provide government vehicles with additional propellant. In one embodiment, the transportation node platform 52 can be used to enhance modified Earth departure storage 164 and upper stage 162 with add-on tankage, including liquid oxygen tank 27 and liquid hydrogen tank 28 combined with basic frame 26. The transportation node platform 52 thus provides modified Earth departure stage 164 and upper stage 162 with not only a propellant fill-up, but also with additional storage for increasing propellant tankage capability thereby enabling increased missions beyond Earth.

In FIG. 6, a reassembled Earth departure stage 164 outfitted with a ring tank 143 is shown docked at the transportation node 52. Two Ares upper stages 162 are shown: one of the Ares upper stage 162 is in the process of being outfitted with the ring system 143. The other Ares upper stage 162 already has the ring tank 143 and is currently stored inside the sunshade 46, as it is being refueled via propellant lines 84. A propellant transporter 34 is still depicted in the salvage position attached to one of the Ares upper stages 162 as it prepares to transport the modified vehicle to another location.

The mass of the spent launch vehicle stages 43 used in the assembly of the space facilities can be used in tether related transportation enhancement operations. The tether upgrade package 41 can enhance payloads 31 using the mass of the transportation node platform 52 to catch, move by cable and release the mass of payload 31. The transportation node platform 52 uses the mass and the laws of physics to capture, accelerate, store and release payload 31 in a manner that far exceeds the rather simple functions a container crane in the harbors of Earth.

The transportation node platform gravity created on a long facility is a function of the distance from the center of gravity or center of mass of the entire structure as it orbits Earth or the moon. The long axis of the structure tends to align with and point to the center of mass of the celestial body around which it orbits. This means the slight gravity in the transportation node platform 52 is in two directions radiating out from the center of mass of the long structure. Propellant transfer, propellant settling, and tether operations become easier and possible on the long transportation node platform 52 structure, due to the microgravity.

As propellant depot 40 evolves to transportation node platform 52 more components are added, including the space truss 148, truss elevator robot 152, and long term cryogenic storage 117. Additional services include a vehicle capture device 156, tether capture device 154 and repair and replacement rocket engine services. Commerce can expand with services for single stage to orbit vehicles, transatmospheric vehicles 73 (shown connected with the vehicle capture device 156 of the truss elevator robot 152).

Gravity and orbital drag from small particles of the atmosphere cause the orbital space facility's orbit to decay and ultimately re-enter the Earth atmosphere. Propellant transporter 34 can be used to propel the transportation node 52 into higher orbits to counteract this gravity and orbital drag effect.

Reference is now made to FIG. 7, which illustrates a preferred embodiment of the invention depicting near term sources of propellant for propellant depot 40 with an early cost advantage in low Earth orbit.

FIG. 7A is a section view showing one possible source of propellant: residual LOX propellant 68 and residual liquid hydrogen 70 recovered from the space shuttle flight propellant reserve within the external tank 20. The value of the propellant is a function of the original cost of the propellant on Earth, which is in the one-dollar range per pound. The on-orbit value is enhanced by approximately $10 k per pound where the value of the propellant is approximately $10,000 per pound or $250 million to $500 million per mission with external tank 20 depending on the success in recovering the residual LOX propellant 68 and residual liquid hydrogen 70 and converting it into value on orbit.

A recovery of residual LOX propellant 68 is possible from the LOX tank through external tank 20. External tank 20 can be salvaged in orbit, where the entire tank is salvaged for mass and propellant or external tank 20 can be salvaged for just propellant, in which case residual LOX propellant 68 and residual liquid hydrogen 70 are drained while external tank 20 is attached to space shuttle orbiter 18 and external tank 20 is discarded after the 25,000 to 50,000 pounds of space shuttle flight propellant reserve 82 are recovered.

The space shuttle flight propellant reserve can be stored in several locations including within tanks 66, 72 inside the extended duration orbiter pallet 83. A use for the residual propellants stored in the extended duration orbiter pallet 83 tankage is conversion into power using fuel cells. Both residual LOX propellant 68 and residual liquid hydrogen 70 can be recovered by puncturing 17 inch propellant lines 84 with a puncture probe 85 using a tapping penetrator 86 to fill reusable LOX tank 66 and reusable liquid hydrogen propellant tank 72 before other forces splash the cold propellant onto the hot sides of the tanks of external tank 20. The external tank aft dome has a thin section near the anti-vortex siphon 35 which is also capable of puncture. FIG. 7B depicts puncturing of the 17 inch propellant lines 84 with puncture probe 85 to fill reusable LOX tank 66 before other forces splash the cold propellant on to the hot sides of the tanks of external tank 20.

FIG. 7C shows a side view of another propellant recovery and storage option for residual liquid hydrogen 70. Aft Cargo Carrier (ACC) 108 attached to the aft of external tank 20 can double the payload volume and contains tankage for residual LOX propellant 68 and residual liquid hydrogen 70 captured from external tank. A puncture mechanism 85 can puncture the relatively thin aluminum of external tank 20 with puncture probe 85 and tapping penetrator 86 to recover residual propellant. A simple valve mechanism may also be possible.

Figure 8:
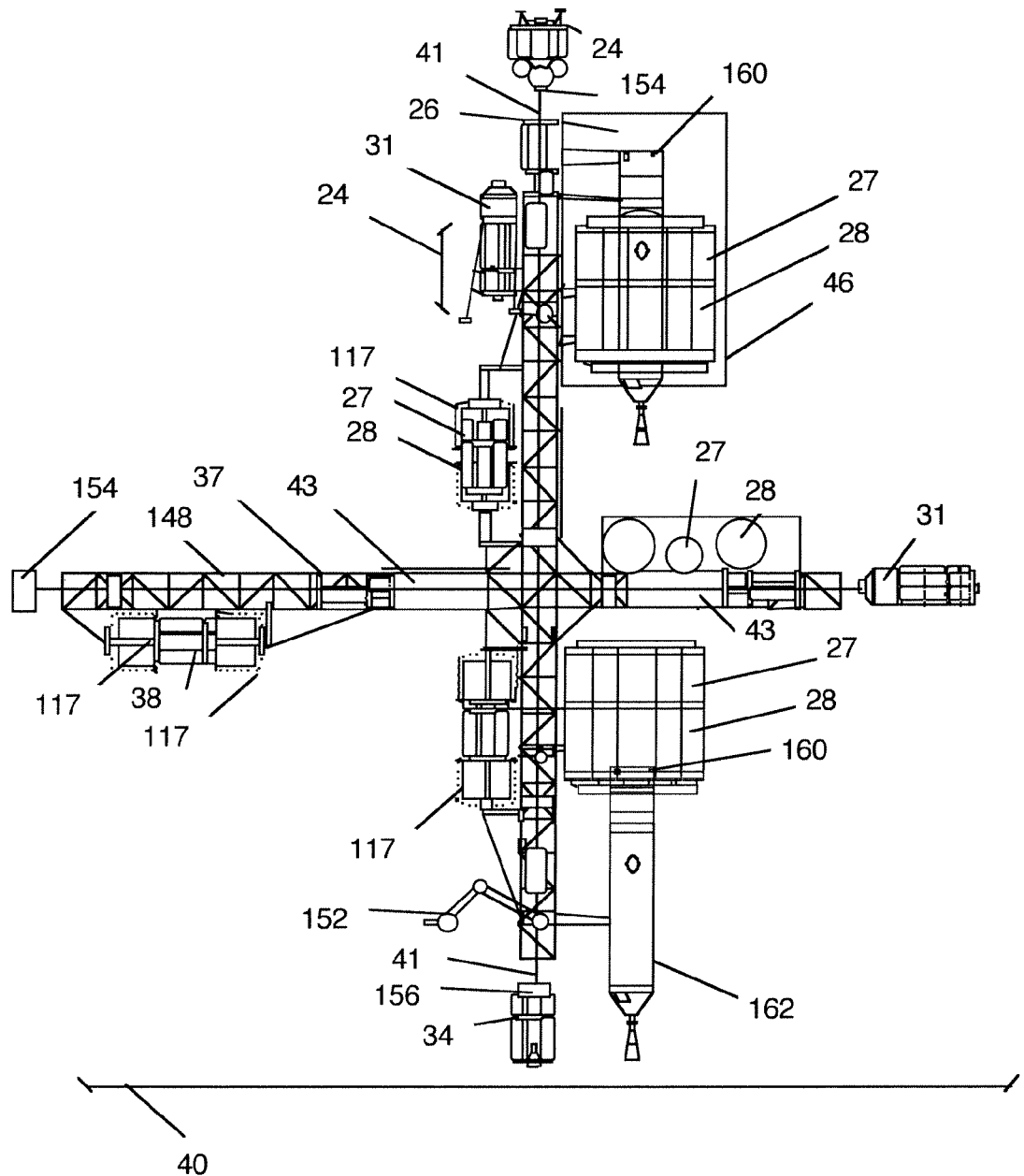
FIG. 8 depicts a propellant depot located at Lagrange point 1, according to an aspect of the present invention.

Reference is now made to FIG. 8, which depicts a Lagrange point (L1) located facility with propellant depot, and transportation node platform capabilities. The L1 facility is positioned between Earth and the moon to effectively use the unique minimum propellant or energy required at Lagrange point one locations. A space cross truss 148 or multiple cross trusses (not shown) can be provided at this propellant depot 40. The cross truss 148 structural sizing accommodates various diameter sizes of payload hardware. Payload 31 using tether upgrade package 41 can adjust the mass on the four, six, or more truss directions to maintain a propellant depot position at Lagrange point one with minimum energy adjustments. Each arm, and there can be as many a six or more arms radiating from the central point, can and will have its own gravity due to the gravitational or gravity gradient effect of length of structures orbiting two celestial bodies.

As with propellant depots at other locations, long-term cryogenic storage 117 is accomplished by several means including covering pre filled tanks such as liquid oxygen tank 27, and liquid hydrogen tank 28 with protective shields to protect from the sun. Another storage method involves salvaging tankage for refitting and use. These recoverable launch vehicle components are reworked and filled with propellant delivered from salvaged launch vehicles.

The salvage is accomplished at locations of discard with L−1 propellant depot 40 being ideally positioned for the salvage of earth departure discard of Earth departure stage 164. These salvaged vehicles are configured into groups of tankage for enhancement of their capabilities. Accommodation and servicing of salvaged hardware is accomplished by salvage attach hardware 37 on frame 26 for capture and vehicle capture device 156 on propellant depot 40. Further the salvaged items are serviced and can be enhanced by large sunshade 46, truss elevator robot 152, tether capture device 154, and long-term cryogenic storage 117.

Figure 9:
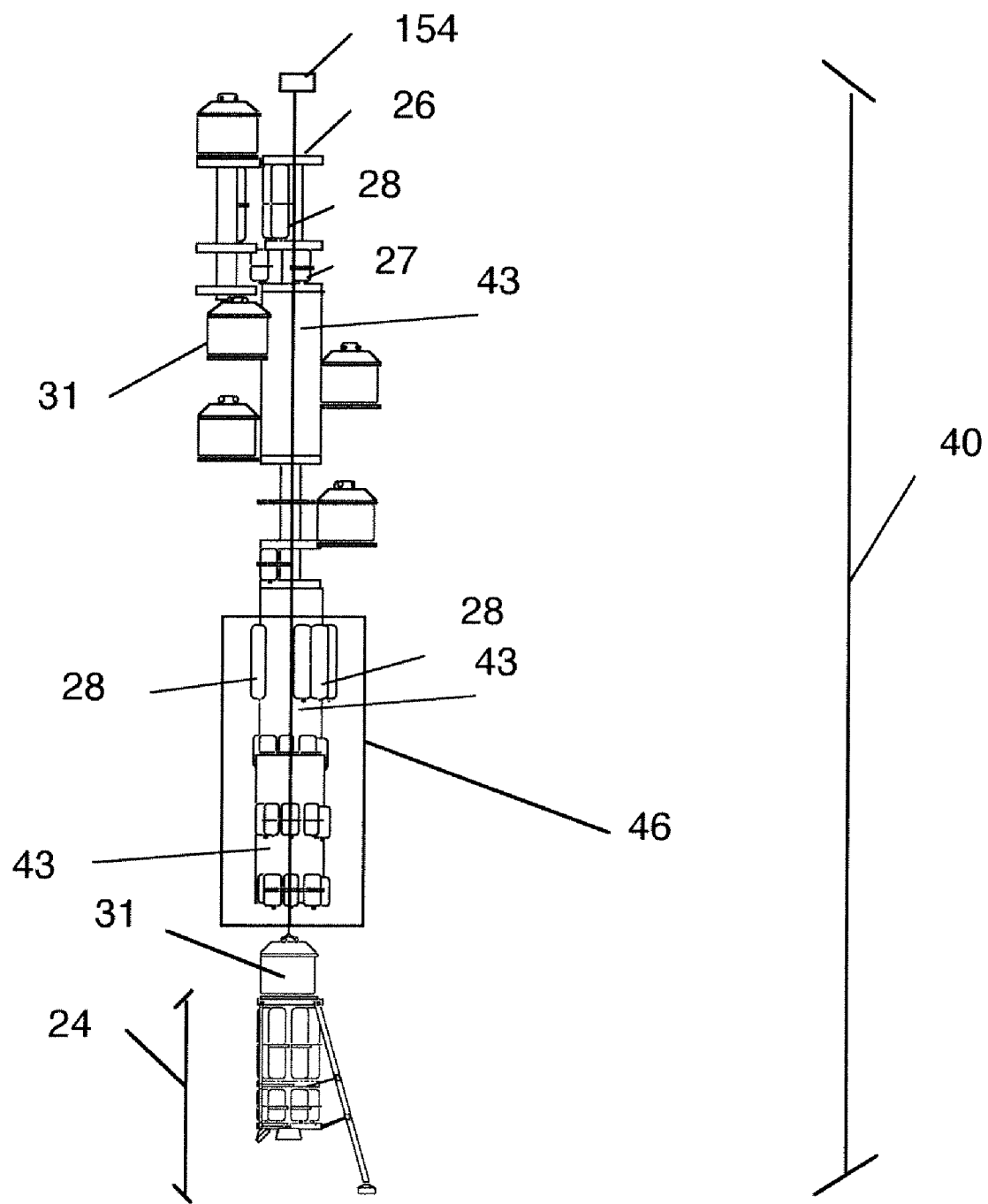
FIG. 9 depicts a propellant depot located in lunar orbit, according to an aspect of the present invention.

FIG. 9 depicts lunar orbit propellant depot 40 located in lunar orbit. The lunar orbit propellant depot with tether upgrade package 41 accepts and releases lunar lander units 24 to and from moon surface facilities. Further lunar propellant depot accepts and releases payload 31. Cargo can be transferred from vehicles from Earth to a more rugged lunar lander 24 for the next transportation cycle to the moon. Propellant depot 40 in lunar orbit is constructed from spent launch vehicle stages 43 and basic frames 26, and can include a tether upgrade package 41, as well as cryogenic storage (e.g., a sunshade 46). The depot 40 can also include communications, observation and habitation components.

Figure 10A:
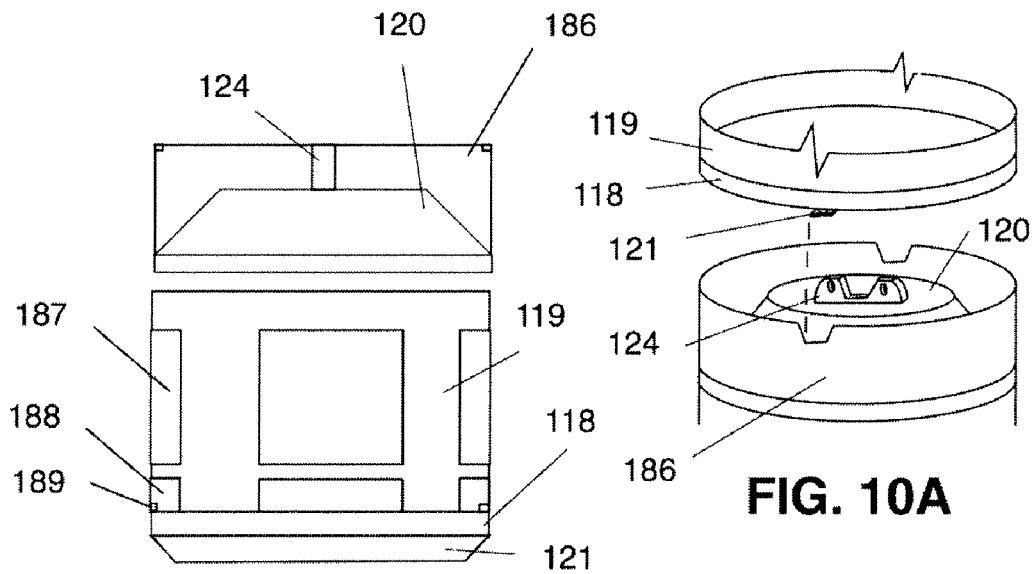
FIGS. 10A-10C show a perspective view, side view and front view, respectively, of standardized cargo containers, according to an aspect of the present invention.
Figure 10B:
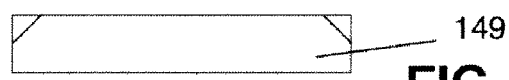
Figure 10C:
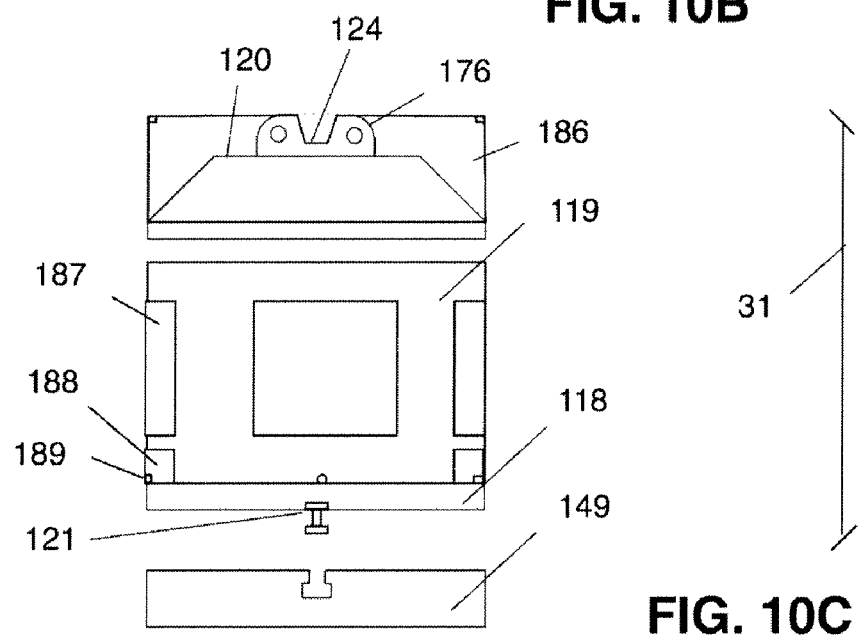

Reference is now made to FIGS. 10A, 10B, and 10C, which illustrate a preferred embodiment of a space containerized cargo system. The integration of payload into launch vehicles has in the past been difficult due to the required significant collection of specialized aerospace interface tasks, usually complicated by the vertical assembly of launch vehicles on a launch pad. For this reason, interfacing payload with launch vehicles has demanded a high cost to the payload owners. Sometimes this integration cost approaches the cost of the payload themselves.

To reduce the payload integration costs for each transfer of cargo payload in the varied environments in space, a standardized payload container 31 is depicted in FIGS. 10A, 10B, and 10C. FIG. 10A depicts a perspective view showing a lower portion of a payload including a payload container side 119, a payload container base plate 118, and an embedded beam 121. The payload container base plate 118 and embedded beam 121 can be placed on container wall extension 186 of another payload container to permit vertically stacking of payload containers by nesting of embedded beam 121 with notches in the container wall extension 186. Wall extension 186 thus enables individual containers to be stacked vertically. Embedded beam 121 also fits into payload container handling device 124 for added support when payloads are stacked.

FIG. 10B depicts a side view perpendicular to embedded beam 121. FIG. 10C depicts a side view parallel to embedded beam 121. The cargo container or payload 31 has a payload container base plate 118 with a roller beam 121 facilitating transfer of payload 31 to and from other locations using a base match 149. Earth gravity requires a single hoisting direction, while no gravity probably requires two forms of control on payload container 31. Thus, the payload container enables movement control in two directions: sideways via a mechanically driven side movement roller beam 121; and upwards using payload container handling device 124. U.S. patent application Ser. No. 11/076,950 in the names of Kistler et al., filed Mar. 11, 2005 explains the embedded beam 121 in greater detail, and is expressly incorporated by reference herein in its entirety. U.S. patent application Ser. No. 11/232,932 entitled "Space Transportation Node Including Tether System," filed Sep. 23, 2005, explains the payload container handling device 124, where two holes 176 are used for container weight transfer, while under suspension.

Payload container side 119 can have many variations and sizes. In one embodiment, the side 119 include solar cells 187 for providing power, a printed bar code 188 that provides information about the contents of the container, and a plug and play input 189 that receives data connections and provides the ability to obtain information about the contents within the container. The container side 119 can be a simple structural frame or pressurized tankage. Payload container side 119 could also be an enclosed pressurized volume container capable of reuse and refitting on the surface of the moon or other celestial bodies. Such a payload container side 119 could be used a warehouse and/or a tool room volumes. The diameter of payload container side 119 and the entire interior volume is a function of the permitted Earth to orbit transportation payload diameter.

Payload container top 120 is attached to payload container side 119 and structurally incorporates a payload container handling device 124. The handling device 124 is for lifting, moving, grappling with a tether and accommodating a quick couple and decouple attachment. As noted above, roller beam 121 enables a second form of payload handling and provides a motorized sideways movement remotely controlled from elsewhere. The notch for the roller beam 121 is added in wall extension 186. Container base match 149 accommodates the roller beam 121 and is used in combination with payload container handling device 124 to control the cargo and attached vehicles in transportation situations having varying gravity conditions.

Reference is now made to FIGS. 11A-D, which illustrate preferred embodiments of unloading payload from lunar lander 24 using the payload systems described with respect to FIG. 10. FIGS. 11A and 11B depict a side view and top view, respectively, of lunar lander 24 and space truss 148 erected to perform an initial transfer of payload 31 to the moon surface 62. Payload 31 contains space truss 148, which is capable of being assembled by suited workers and stabilized by connections to lunar lander 24 and tension X bracing 151. Space truss 148 contains individual truss pole members, with a length driven by the Earth launch vehicle payload diameter, joined together with the aid of tension X bracing 151. Surface bearing shoe 104 and wheel assembly 105 can be added as required by conditions and reuse. The truss 148 can be rolled on its side, using lunar surface tires 167.

The payload handling in space is duplicated on the moon 62 for cost reduction reasons. The assembled and braced structural frame operates to accept payload 31 from lunar lander 24 when payload base plate 118 cooperates with the container base match 149. That is, the payload 31 can slide or transfer between the space truss 148 erected near the lunar lander 24 and the lunar lander 24 using embedded beam 121. The transfer of the payload 31 using the embedded beam 121, as described in U.S. patent application Ser. No. 11/076,926 to Kistler et al., the disclosure of which is expressly incorporated by reference herein in its entirety. Once on the container base match 149 of the space truss 148, the payload 31 can be lowered to the moon surface 62 for transport elsewhere on the moon surface 62.

FIG. 11C depicts a side view of lunar lander 24 unloading on moon surface 62 using a second type of unloading method employing a utility vehicle 166. FIG. 11D depicts a top view of the lunar lander 24 and the surface utility vehicle 166. The transfer between the lunar lander 24 and the utility vehicle 166 uses the embedded beam 121 on the payload container base plate 118 and a motor on the container base match 149 of the lunar lander 24. The two container base matches 149 enable both the lunar lander 24 and the surface utility vehicle 166 to handle cargo. The utility vehicle 166 is positioned near the lunar lander 24 to transfer or slide payload 31 using the embedded beam 121 into container base match 149. The container base match 149 acts as a platform on a cargo lifter 183 of the surface utility vehicle 166.

The surface utility vehicle 166 has the ability to transport payload 31 to various locations on the moon surface 62. The surface utility vehicle 166 contains individual multiple connector ends 168 capable of accepting a variety of attachments including ramp attachment 181 and counterweights The utility vehicle 166 is designed for servicing reusable lunar lander 24 with propellant and payload 31 transfers on the surface of the moon 62 or any celestial body. Lunar lander 24 starts a construction process by establishing a construction base, transporting an excavator with support equipment and the beginning of lunar propellant depot based on the recovery of propellant components from the lunar regolith. A similar logistics system would support the discovery of ice in the shaded craters near the moon poles.

Figure 12A:
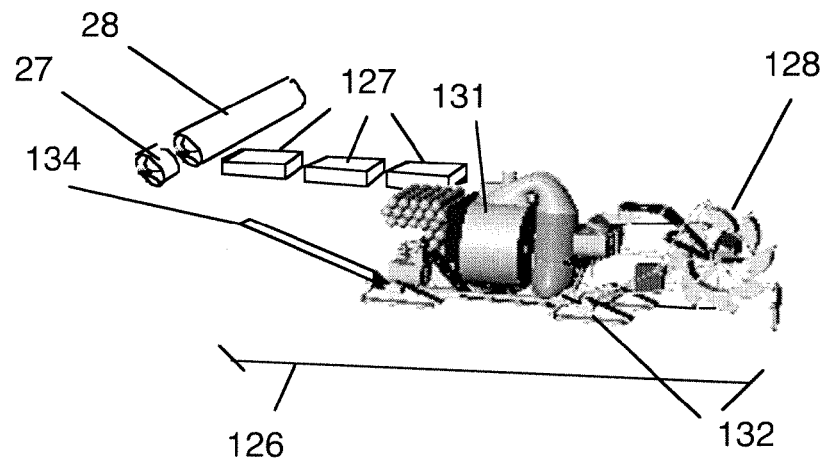
FIG. 12A depicts a perspective view of a lunar miner extracting propellant from the lunar surface, according to an aspect of the present invention.
Figure 12B:
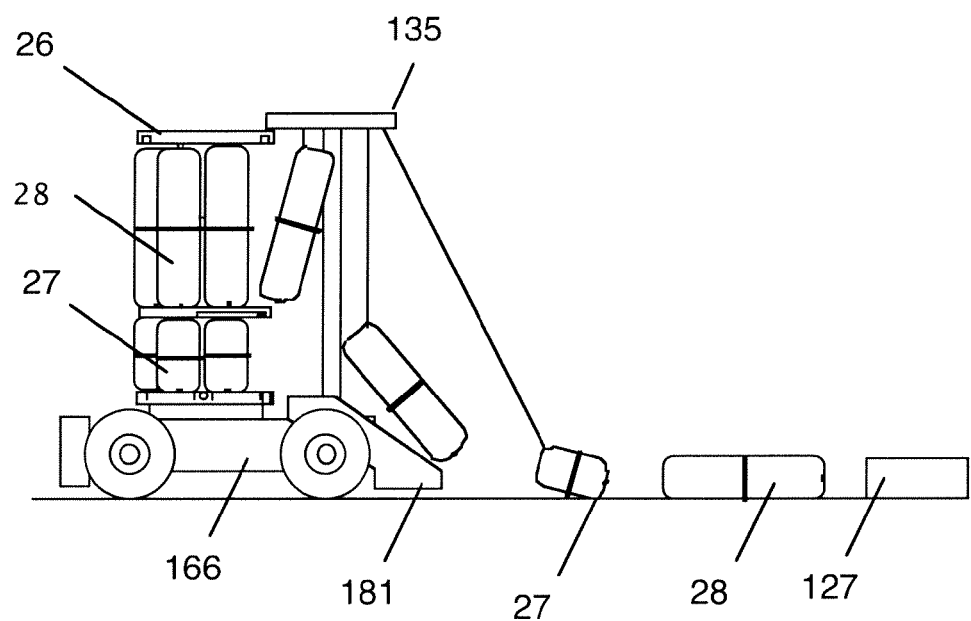
FIG. 12B shows a surface recovery vehicle recovering extracted gas, according to an aspect of the present invention.

Reference is now made to FIGS. 12A and 12B, which illustrate recovery of lunar resources with a lunar surface vehicle. On the moon surface or subsurface, a new source of propellants is anticipated to be developed. This propellant could come from some form of ice that is believed to be present at moon poles or from moon regolith in the form of base elements and volatiles driven off by heat and captured in containers for further processing. If the propellant is available in some form on the moon surface or subsurface, then it takes some mining, processing, surface transportation and space transportation to bring this propellant to a market that does not presently exist. Basic lunar rover miner 126 is one of many methods of creating a source of propellants to facilitate mankind's movement off the Earth.

FIG. 12A shows a process of mining the regolith on the lunar surface. The lunar regolith contains valuable recoverable elements, including components of propellant, and can be mined in one or more manners with a roving multiple component mining machine capable of two directional operation or the capability to reverse direction for the efficient excavation, processing, heating, recovery and restoration of moon crater regolith in a cost effective profitable manner.

FIG. 12A depicts lunar rover miner 126 with crawler tracks 132, an excavation head 128, a process tank 131, and a rotating discharge conveyor 134. This lunar rover miner 126 recovers gas components in the form of a variety of products. Lunar rover miner 126 heats the regolith to extract gaseous oxygen and hydrogen and stores the gas in reused liquid oxygen tanks 27 and reused liquid hydrogen tanks 28. The tanks 27, 28 are left on the moon surface for later pick up. Heated regolith, after the volatilities are removed by the basic lunar rover miner processing, may be formable or capable of shaping into large blocks of by-product construction material 127 or small bricks useful in construction. The bricks 127, are left for later pickup.

FIG. 12B illustrates collecting of reusable liquid oxygen tank 27 and liquid hydrogen tank 28, in addition to any other component of value recovered and/or processed during the regolith mining process (such as the bricks 127). The gaseous oxygen and hydrogen is put into reusable tanks with a multiple use valve and left by the lunar rover miner 126 to be recovered and later converted into reusable liquid hydrogen and liquid oxygen. A material handling jib 135 of the utility vehicle 166 enables the recovery. That is, the utility vehicle 166 is modified with a recovery material handling jib 135 to load liquid oxygen tanks 27 and liquid hydrogen tanks 28 via the ramp attachment 181 (possibly including a conveyer belt) into basic frame 26. Once the frame 26 is full, it is transported to a lunar propellant depot for processing. In one embodiment, these vehicles 166 are operated during the lunar day by solar energy and robotically controlled from Earth.

The surface utility vehicle 166 performs construction, resource recovery tasks and basic transportation on the moon. The surface utility vehicle 166 preferably has at least four lunar surface tires capable of individual drive power and the ability to widen the wheel base as required for various uses. One operation of the surface utility vehicle 166 is unloading empty liquid oxygen tank 27 and liquid hydrogen tank 28 from the lunar lander 24. Another operation is loading full liquid oxygen tank 27 and liquid hydrogen tank 28 onto the lunar lander 24 for launch. Another operation is the pick up and transport of liquid oxygen tanks 27 and liquid hydrogen tanks 28 from the moon surface.

Figure 13A:
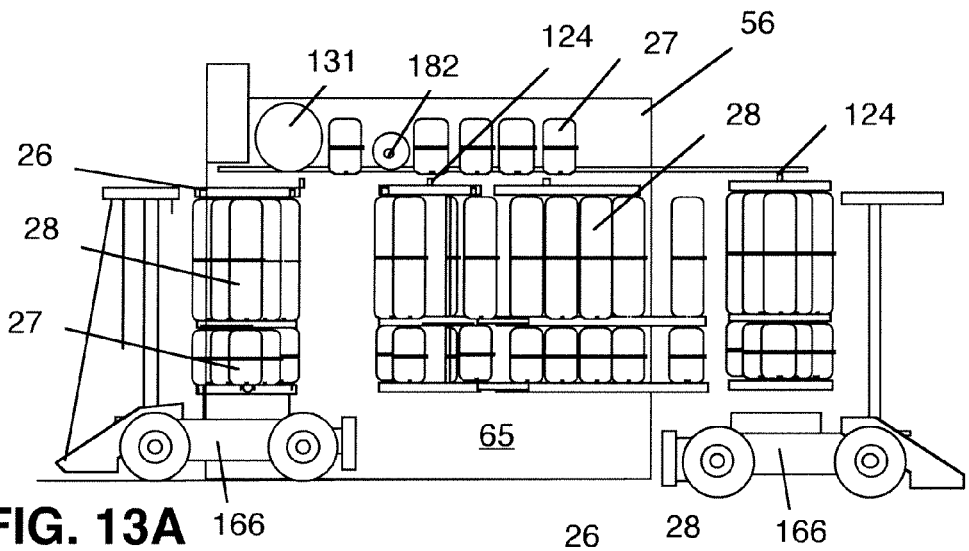
FIG. 13A shows a side view of a lunar surface commercial propellant production processing plant, according to an aspect of the present invention.
Figure 13B:
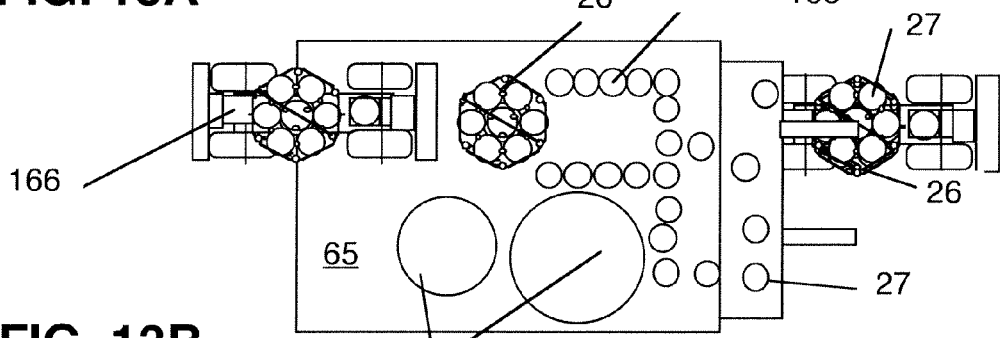
FIG. 13B shows a top view of a lunar surface commercial propellant production processing plant, according to an aspect of the present invention.

Reference is now made to FIGS. 13A and 13B, which illustrate a side view and top view, respectively, of a central plant recovering lunar resources valuable enough for transport. The processing of gaseous propellant components into cryogenic propellants requires significant energy. This energy can initially come from solar energy, but eventually Helium3 will be developed as a power source and will be able to provide moon surface power in a scalable manner for vehicles, processing plants and other lunar facilities.

Figure 13C:
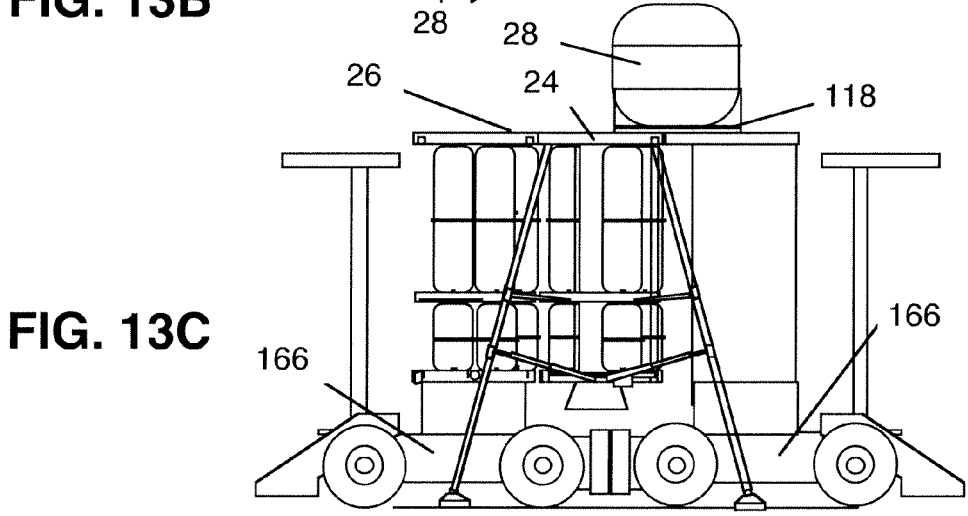
FIG. 13C shows reloading of propellant onto a lunar lander, according to an aspect of the present invention.

FIG. 13A depicts a side view of a segment of lunar surface propellant depot 65, illustrating a central plant method of recovering lunar resources in the form of gaseous propellant. The gaseous propellant is valuable enough to reduce to cryogenic liquid propellant for transport from lunar surface propellant depot 65 and/or for commercial sales. Gaseous oxygen tank 27 and gaseous hydrogen tank 28 are brought to the plant on the right side of FIG. 13A. The tanks 27, 28 are unloaded and processed into cryogenic propellants. The tanks 27, 28 are then reloaded into basic frame 26. The full frame 26 is then loaded into a surface utility vehicle 166 and transported to the lunar lander 24 for launch (FIG. 13C). In one embodiment, propellant is carried from the lunar surface propellant depot 65 in reusable liquid oxygen tank 27 and liquid hydrogen tank 28 with flat valving 182, such as that described in U.S. patent application Ser. No. 11/412,786, filed Apr. 28, 2006, in the names of Jones et al., the disclosure of which is expressly incorporated by reference herein in its entirety. This flat valve permits reuse of the tank and allows continued filling and outflow as required with both cryogenic and gaseous liquid oxygen and hydrogen, in addition to Helium3 and Helium4.

Lunar lander 24 permits basic frame racks 26 both empty and full to be turned, moved sideways and reloaded on surface utility vehicle 166. Surface utility vehicle 166 transports the basic frame 26 to the lunar lander 24 from the lunar processing depot 65.

FIGS. 13B and 13C also illustrate processing of regolith in which a liquid hydrogen tank 28 having a larger diameter is processed in a similar method for transport to lunar orbit for delivery to space vehicles with different diameter tank requirements.

FIG. 13C depicts a side view of loading liquid oxygen tank 27 and liquid hydrogen tank 28 within basic frame 26 into lunar lander 24 on the left. FIG. 13C depicts a side view of loading larger diameter liquid hydrogen tank 28 as a payload without basic frame 26 into lunar lander 24 on the right with payload container base plate 118.

Figures 14A, 14B:
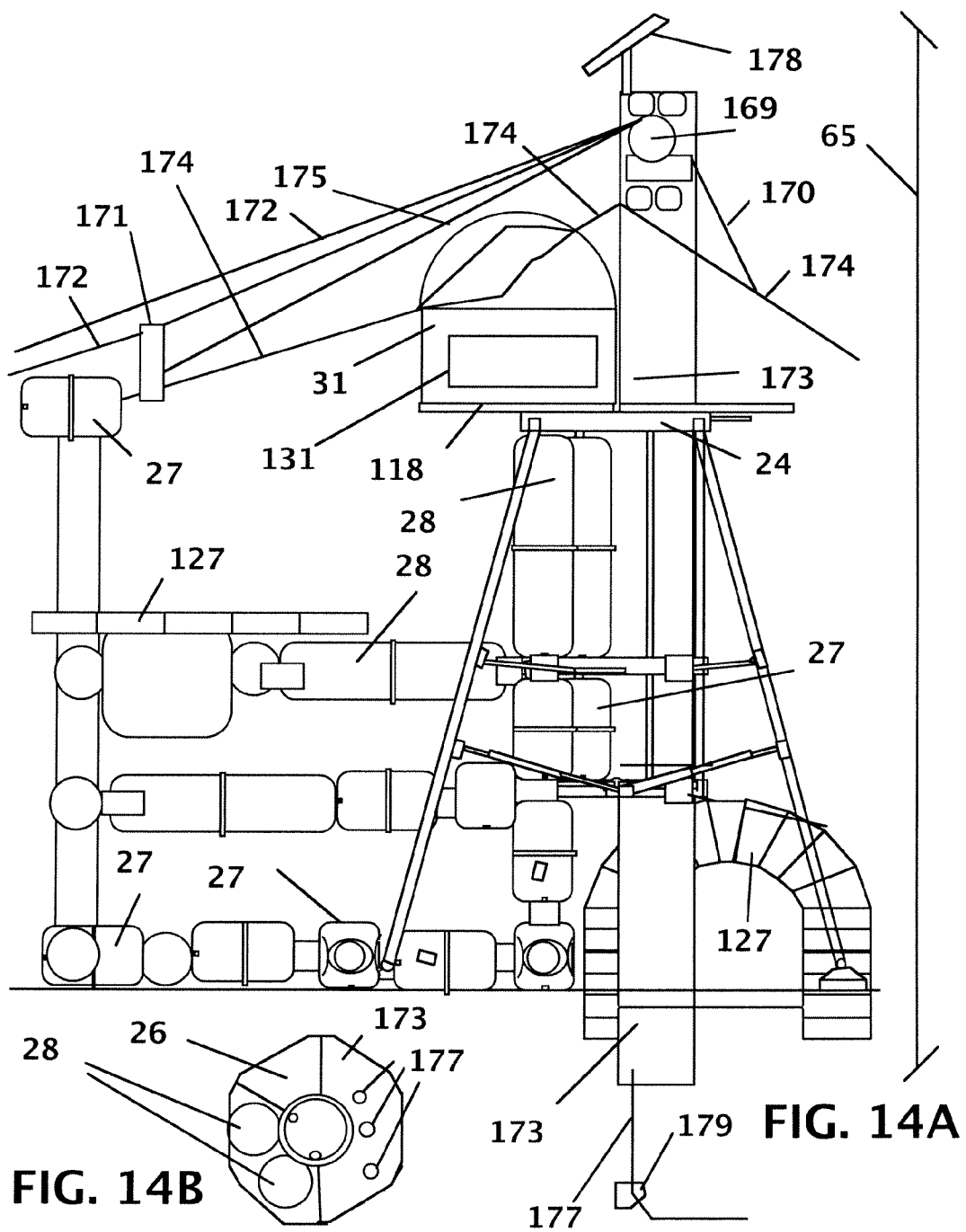
FIGS. 14A and 14B show a side view and top view, respectively, of another lunar surface commercial plant, according to an aspect of the present invention.

Reference is now made to FIGS. 14 and 14B, which illustrate a preferred embodiment of a lunar lander 24 converted into other moon surface uses by abandonment of the lunar lander 24 and cannibalization of components of lunar lander 24. A dragline of such a processing plant could collect regolith, e.g., within a 12 kilometer lunar crater, and process it, rather than processing in the field with the lunar rover 126. FIGS. 14A and 14B illustrate a side view and top view, respectively, of a central single location source processing plant for recovering lunar resources valuable enough for transport. Payload 31 and/extendable payload 173 are used to develop and operate a dragline 171 feeding a tower processing plant for extracting lunar resources. Lunar resources are fed at the top and use various processing to recover and store valuable components of regolith.

Dragline system 169 is used to pull regolith to process tank 131 to the top of a regolith pile 174. Dragline bucket 171 uses haul cable 175 to move regolith up to and inside payload 31, which recovers lunar resources of value. Liquid oxygen tank 27 and liquid hydrogen tank 28 (and other items) can use regolith as a cover for radiation protection. Liquid oxygen tank 27 is used to build an export material tunnel and protect some modules from regolith soil pressure. The tunnel can also be built with by product construction materials 127. Basic frame 26 for this vehicle is altered as basic frame with expansion connectors 37 to accept extendable payload 173 capable of extending from normal tank locations through basic frame 26 plates upward and below normal volume including underground applications. This extendable payload 173 alters the normal flat plate designs to allow higher or above and deeper or subsurface applications to be developed from the typical basic frame 26 and to make full utilization of abandoned basic frame 26.

Dragline system 169 is transported to the moon surface and assembled upwardly using extendable payload 173 to use dragline 171, dragline haul cable 172, extendable payload 173, haul cable 175 and anchor cables 170 to draw regolith into the lunar orbit propellant depot 65. Lunar lander 24 is modified into basic frame with expansion connectors 37 in various ways to provide both the ability to affordably extend upward and downward payload 31 volumes and propellant tank volumes for expanded lunar development of lunar resources 64. To do this expanded development some liquid oxygen tank 27 and liquid hydrogen tank 28 volumes would be replaced with extendable payload 173 and a one-location single source regolith or ice resource would be developed to produce propellants from the moon.

Extendable payload 173 extends into volumes below the basic frame with expansion connectors 37 for purposes of drilling and mining a central single location source feeding a processing plant recovering lunar resources from ice and/or regolith. Basic frame with expansion connectors 37 is modified to permit extendable payload 173 expansions into subsurface volumes for drilling, mining and human exploration for habitation and other purposes. Drill holes 177 are drilled into subsurface areas for the recovery of ice deposits and lunar resources. Extendable payload 173 provides vertical length for the transport of long drill stem materials and a pressurized volume in which to operate drill equipment and related drilling operations. A drill hole block for horizontal drilling 179 is used to create an anchor and permit drilling in a sideways or horizontal direction permitting one drill location setup to access a variety of subsurface locations for lunar resources. In the polar regions, the extended length of extendable payload 173 capabilities can provide access to permanently available sun regions above the extendable payload 173 so as to provide uninterrupted solar power using uninterrupted solar power collector 178.

The lesson may be that on the trip to the moon and back, the gravity well and atmosphere in the first leg from Earth to low Earth orbit create an expensive first leg requiring a specialized space transportation vehicle designed for the difficult environment, while the simple coast to lunar orbit is less complicated and probably requires a different vehicle. The trip down to the surface of the moon requires a sturdy vehicle capable of the ⅙th gravity moon environment with enough propulsion to get back off the moon with some cargo capability. This probably means a LEO propellant depot and later evolved transportation node are the way to go for sustainable long-term transportation to and from the moon.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above are hereby incorporated by reference.

What is claimed is:

1. An orbital propellant depot system, comprising:
   a low Earth orbit propellant depot that is supplied with propellant from an Earth based source, the low Earth orbit propellant depot storing propellant and refueling vehicles; and
   a lunar orbit propellant depot that is supplied with propellant from a lunar propellant source, the lunar orbit propellant depot storing propellant and refueling spacecraft.

2. The system of claim 1, further comprising another propellant depot located at Lagrange point one, the Lagrange point one propellant depot storing propellant and refueling spacecraft.

3. The system of claim 1, in which the low Earth orbit propellant depot comprises a basic frame structure having expansion connectors.

4. The system of claim 3, in which the low Earth orbit propellant depot further comprises at least one salvaged launch vehicle stage having a second use attachment.

5. The system of claim 1, in which the low Earth orbit propellant depot comprises cryogenic storage.

6. The system of claim 5, in which the cryogenic storage comprises a sunshade.

7. The system of claim 5, in which the cryogenic storage comprises a plurality of magnetic suspension plates supporting a cryogenic tank.

8. The system of claim 1, in which the low Earth orbit propellant depot comprises a tether system.

9. The system of claim 1, further comprising a ring tank system including a plurality of propellant tanks that can circumscribe a salvaged vehicle to increase the tankage of the salvaged vehicle, the ring tank system comprising rotational propellant feed lines and rotational propellant vent lines.

10. The system of claim 1, further comprising a lunar lander that transports payload to and from a lunar surface and docks with the low Earth orbit propellant depot and/or the lunar orbit propellant depot.

11. The system of claim 10, wherein the lunar lander is docked, standardized payload containers are transferred via a space containerized cargo system.

12. The system of claim 10, further comprising a lunar surface space truss that is transported within a standardized payload container by the lunar lander, the lunar surface space truss, once assembled, receiving payload from the lunar lander and lowering the received payload to the lunar surface.

13. The system of claim 10, further comprising a lunar surface utility vehicle comprising a cargo lifter, the lunar surface utility vehicle receiving payload from the lunar lander and lowering the received payload to the lunar surface.

14. The system of claim 1, further comprising a lunar rover miner that excavates regolith, heats the regolith to extract gaseous oxygen and gaseous hydrogen and other resources, and stores the extracted gas within tanks.

15. The system of claim 14, further comprising a lunar utility vehicle having a material handling jib that facilitates collecting the gas tanks from the lunar surface after the lunar rover miner has filled the tanks and left the filled tanks on the lunar surface.

16. The system of claim 15, further comprising a lunar processing plant that converts the extracted gas into cryogenic propellants, the cryogenic propellants comprising the lunar propellant source.

\* \* \* \* \*